United States Patent
Scofield et al.

(10) Patent No.: US 9,257,042 B2
(45) Date of Patent: Feb. 9, 2016

(54) LEARNING ROAD FEATURE DELAY TIMES BASED ON AGGREGATE DRIVER BEHAVIOR

(75) Inventors: Christopher L. Scofield, Seattle, WA (US); Robert Cahn, Federal Way, WA (US); Weimin Mark Wang, Bellevue, WA (US); Alec Barker, Woodinville, WA (US); Robert Frederick Leidle, Bellevue, WA (US)

(73) Assignee: Inrix, Inc., Kirkland, WA (US)

( * ) Notice: Subject to any disclaimer, the term of this patent is extended or adjusted under 35 U.S.C. 154(b) by 1137 days.

(21) Appl. No.: 13/046,650

(22) Filed: Mar. 11, 2011

(65) Prior Publication Data

US 2011/0224893 A1 Sep. 15, 2011

Related U.S. Application Data

(60) Provisional application No. 61/312,967, filed on Mar. 11, 2010.

(51) Int. Cl.
*G08G 1/052* (2006.01)
*G01C 21/34* (2006.01)
*G08G 1/01* (2006.01)

(52) U.S. Cl.
CPC ............ *G08G 1/052* (2013.01); *G01C 21/3492* (2013.01); *G08G 1/0104* (2013.01)

(58) Field of Classification Search
USPC .......................... 701/117, 118, 119, 414, 423
See application file for complete search history.

(56) References Cited

U.S. PATENT DOCUMENTS

| | | | |
|---|---|---|---|
| 6,016,485 A | 1/2000 | Amakawa et al. | 705/400 |
| 6,885,937 B1 | 4/2005 | Suranyi | 701/208 |
| 2004/0038671 A1 | 2/2004 | Trayford et al. | 455/414.3 |
| 2004/0143385 A1 | 7/2004 | Smyth et al. | 701/117 |
| 2005/0131597 A1 | 6/2005 | Raz et al. | 701/29 |
| 2006/0111833 A1 | 5/2006 | Feldman et al. | 701/117 |

(Continued)

FOREIGN PATENT DOCUMENTS

WO 2009/158058 12/2009

OTHER PUBLICATIONS

"Etak GeoEngine 4.0," retrieved on Mar. 11, 2011, from http://www.wirelessnetworksonline.com/product.mvc/Etak-GeoEngine-40/0001, 1 page.

*Primary Examiner* — John R Olszewski
*Assistant Examiner* — Gerrad A Foster
(74) *Attorney, Agent, or Firm* — Seed IP Law Group PLLC

(57) ABSTRACT

Techniques are described for generating and using information regarding road traffic in various ways, including by obtaining and analyzing road traffic information regarding actual behavior of drivers of vehicles on a network of roads. Obtained actual driver behavior information may in some situations be analyzed to determine actual delays for vehicles encountering various particular road features in the network of roads, such as for identified decision points at which drivers face choices corresponding to possible alternative routes through the network of roads (e.g., intersections, highway exits and/or entrances, etc.) and/or for other traffic flow impediments. The identified and determined information from the analysis may then be used in various manners, including in some situations to assist in determining particular recommended or preferred routes of vehicles through the network of roads based at least in part on actual driver behavior information.

38 Claims, 6 Drawing Sheets

(56) References Cited

U.S. PATENT DOCUMENTS

| | | | |
|---|---|---|---|
| 2007/0124068 A1 | 5/2007 | Nakayama et al. | 701/210 |
| 2008/0300778 A1 | 12/2008 | Kuznetsov | 701/200 |
| 2009/0099760 A1 | 4/2009 | Lederman et al. | 701/118 |
| 2009/0105940 A1* | 4/2009 | Bitan | 701/201 |
| 2009/0287404 A1 | 11/2009 | DeKock et al. | 701/117 |
| 2010/0228467 A1* | 9/2010 | Wolfe | 701/119 |
| 2011/0112760 A1* | 5/2011 | Serbanescu et al. | 701/204 |
| 2011/0118965 A1* | 5/2011 | Aben et al. | 701/117 |

\* cited by examiner

LEARNING ROAD FEATURE DELAY TIMES BASED ON AGGREGATE DRIVER BEHAVIOR

CROSS-REFERENCE TO RELATED APPLICATIONS

This application claims the benefit of U.S. Provisional Patent Application No. 61/312,967, filed Mar. 11, 2010 and entitled "Performing Road Navigation Based On Aggregate Historical Driver Behavior," which is hereby incorporated by reference in its entirety.

TECHNICAL FIELD

The following disclosure relates generally to techniques for providing information related to road navigation, such as for routes through a network of roads that are based at least in part on actual delay times for road features learned from actual behavior of drivers of vehicles on the roads.

BACKGROUND

Increasing road traffic and corresponding congestion has various negative effects. Accordingly, efforts have been made to combat increasing traffic congestion in various ways, such as by making information about current traffic conditions available. Such current traffic information may be provided to interested parties in various ways (e.g., via radio broadcasts, an Internet Web site that displays a map of a geographical area with color-coded information about current traffic congestion on some major roads in the geographical area, information sent to cellular telephones and other portable consumer devices, etc.). One source for information about current traffic conditions includes observations manually supplied by humans (e.g., traffic helicopters that provide general information about traffic flow and accidents, reports called in by drivers via cell phones, etc.), while another source in some larger metropolitan areas is networks of traffic sensors capable of measuring traffic flow for various roads in the area (e.g., via sensors embedded in the road pavement). Unfortunately, various problems exist with respect to such information, such as related to the accuracy and coverage of the information, as well as to similar information provided by other sources.

One use of road traffic information includes providing the road traffic information to drivers of vehicles, such as to notify drivers of recent road traffic on particular roads of interest. In addition, automated navigation systems may use information about roads in various manners, including to generate and display a route between two indicated locations. However, various problems exist with current navigation systems and other current techniques for determining routes.

DETAILED DESCRIPTION

Figure 1:
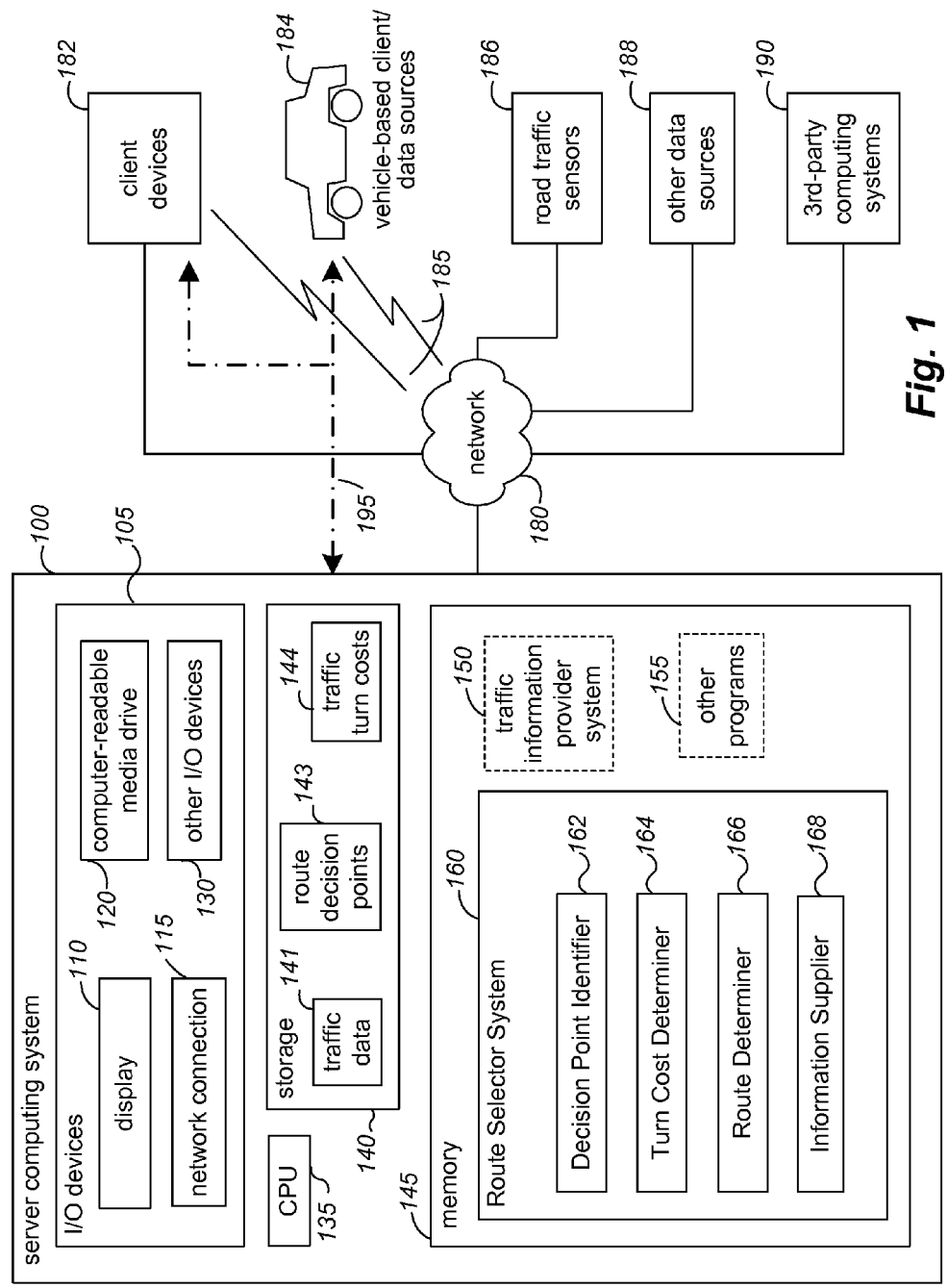
FIG. 1 is a block diagram illustrating a computing system suitable for executing embodiments of the described Driver Behavior Analysis system and the described Route Selector system.

Techniques are described for generating and using information regarding road traffic in various ways, including in some embodiments to determine routes through a network of roads based at least in part on information about road traffic for those roads. In at least some embodiments, road traffic information that is used for a network of roads includes information regarding actual behavior of drivers of vehicles on that road network, which may be obtained in various manners (e.g., based on analyzing historical information and/or on monitoring particular current driver behavior of interest). For example, obtained actual driver behavior information may in some embodiments be analyzed to identify decision point locations at which drivers face choices corresponding to possible alternative routes through the network of roads (e.g., intersections, highway exits and/or entrances, etc.), as well as to track the actual use by drivers of particular paths between particular decision points in order to determine preferred compound links between those decision point locations. In addition, obtained actual driver behavior information may be used in some embodiments to determine actual delays for vehicles encountering various particular road features at which road traffic is restricted during at least some times, such as for decision point locations or other traffic flow impediments in the network of roads. Additional details related to using actual driver behavior information in particular manners are described below, and some or all of the described techniques for using actual driver behavior information are automatically performed in at least some embodiments by an automated Driver Behavior Analysis ("DBA") system.

In addition, in at least some embodiments, the described techniques may further include determining particular recommended or preferred routes between locations in manners that are based at least in part on actual driver behavior information, such as based on identified decision points and associated compound links determined from alternative path usage and/or based on actual determined delays for particular traffic flow impediments on route alternatives. Additional details related to determining particular routes between particular locations, including based on actual driver behavior information, are described below, and some or all of the described techniques for determining particular routes are automatically performed in at least some embodiments by an automated Route Selector ("RS") system. Furthermore, while some embodiments include a DBA system performing particular operations and a distinct RS system performing other particular operations (e.g., with the DBA and RS systems being operated by distinct entities, such as unaffiliated entities), in other embodiments some or all of the various described operations may instead be performed by a single system operated by a single entity. In addition, in some embodiments, road traffic information that is automatically identified, determined or otherwise generated based on actual driver behavior by the DBA system may be used for other purposes that do not include determining particular recommended or preferred routes, whether by an embodiment of the DBA system or a distinct other system, as discussed in greater detail below.

Before discussing some details of the described techniques performed by embodiments of the DBA and/or RS systems, some aspects are introduced regarding road traffic information that may be available for use by the DBA and/or RS systems in at least some embodiments. In particular, such available road traffic information may have various forms. For example, in some embodiments, available road traffic information may include historical traffic data that reflects information about traffic for various target roads of interest in a geographical area, such as for a network of roads in the geographic area. In addition, in some embodiments, the available road traffic information may include current traffic data and/or automatically determined predicted future traffic data. Furthermore, various road traffic information may be obtained in various manners, such as from stationary road traffic sensors (e.g., data readings from a physical sensor that is near to or embedded in a road, such as to report aggregate data for large numbers of vehicles corresponding to a particular road location) and/or from mobile data sources (e.g., a series of data samples that are obtained from a vehicle or other mobile data source that is currently or recently engaged in a trip over particular roads, such as with each data sample including an associated road location and time). Moreover, such data readings and data samples may be filtered, conditioned and/or aggregated in various ways before further use.

In addition, road traffic information may be tracked and/or determined for various measures of traffic conditions in various embodiments, such as one or more of the following: average speed, a volume or frequency of traffic for an indicated period of time (e.g., to indicate a total number of vehicles during that time period), an average occupancy time of one or more traffic sensors or other locations on a road (e.g., to indicate the average percentage of time that a vehicle is over or otherwise activating a sensor), one of multiple enumerated levels of road congestion (e.g., measured based on one or more other traffic conditions measures), etc. Such road traffic information may also be tracked and/or determined for each of multiple road locations (e.g., road segments, road map links, particular points on roads, etc.) or other portions of roads during each of multiple time periods, and values for each such traffic conditions measure may be represented at varying levels of precision in varying embodiments. For example, values for an average speed conditions measure may be represented at the nearest 1-MPH ("mile per hour") increment, the nearest 5-MPH increment, in 5-MPH buckets (e.g., 0-5 MPH, 6-10 MPH, 11-15 MPH, etc.), in other defined buckets of constant or varying size, in fractions of 1-MPH increments at varying degrees of precision, etc. Such traffic conditions measures may also be measured and represented in absolute terms and/or in relative terms (e.g., to represent a difference from typical or from maximum).

In some embodiments, one or more roads in a given geographic region may be modeled or represented by the use of road links. Each road link may be used to represent a portion of a road, such as by dividing a given physical road into multiple road links. For example, each link might be a particular length, such as a one-mile length of the road or 200-foot length of the road, or instead some such links may correspond to particular road features (e.g., to represent an intersection or other junction of multiple roads with a particular road link). Such road links may be defined, for example, by governmental or private bodies that create maps (e.g., by a government standard; by commercial map companies as a quasi-standard or de facto standard; etc.) and/or by a provider of the DBA and/or RS systems, such that a given road may be represented with different road links by different entities. It will also be appreciated that roads may be interconnected in various manners, including to allow traffic to diverge or converge at various locations (e.g., to diverge at highway off-ramps; at forks or splits in a road; at other junctions of two or more highways or roads, including an interchange or an intersection that may or may not be controlled by signals, signs, road features such as traffic circles and roundabouts, etc.; at a driveway or other turn from a road; etc., and to converge at highway on-ramps; at merges or joins of multiple roads; at other junctions of two or more highways or roads, including an interchange or an intersection that may or may not be controlled by signals, signs, road features such as traffic circles and roundabouts, etc.; at a driveway or other turn onto a road; etc.). In addition, in some embodiments, one or more roads in a given geographic region may also be modeled or represented by the use of road segments, such as road segments defined by a provider of the DBA and/or RS systems (e.g., manually and/or in an automated manner). Each road segment may be used to represent a portion of a road (or of multiple roads) that has similar traffic condition characteristics for one or more road links (or portions thereof) that are part of the road segment. Thus, a given physical road may be divided into multiple road segments, such as multiple road segments that correspond to successive portions of the road, or alternatively in some embodiments by having overlapping or have intervening road portions that are not part of any road segment, and with some such road segments optionally corresponding to particular road features (e.g., to represent an intersection or other junction of multiple roads with a particular road link). In addition, each road segment may be selected so as to include some or all of one or more road links. Furthermore, a road segment may represent one or more lanes of travel on a given physical road. Accordingly, a particular multi-lane road that has one or more lanes for travel in each of two directions may be associated with at least two road segments, with at least one road segment associated with travel in one direction and with at least one other road segment associated with travel in the other direction. Similarly, if a road link represents a multi-lane road that has one or more lanes for travel in each of two directions, at least two road segments may be associated with the road link to represent the different directions of travel. In addition, multiple lanes of a road for travel in a single direction may be represented by multiple road segments in some situations, such as if the lanes have differing travel condition characteristics. For example, a given freeway system may have express or high occupancy vehicle ("HOV") lanes that may be beneficial to represent by way of road segments distinct from road segments representing the regular (e.g., non-HOV) lanes traveling in the same direction as the express or HOV lanes. Road segments may further be connected to or otherwise associated with other adjacent road segments, thereby forming a chain or network of road segments.

The roads for which road traffic information is tracked and/or determined may be selected in various manners in various embodiments. In some embodiments, traffic information is tracked and/or determined for each of multiple geographic areas (e.g., metropolitan areas), with each geographic area having a network of multiple inter-connected roads. Such geographic areas may be selected in various ways, such as based on areas in which traffic data is readily available (e.g., based on networks of road sensors for at least some of the roads in the area), in which traffic congestion is a significant problem, and/or in which a high volume of road traffic occurs during at least some times. In some such embodiments, the roads for which traffic information is tracked and/or determined may be based at least in part on one or more other factors (e.g., based on size or capacity of the roads, such as to include freeways and major highways; based on the role the roads play in carrying traffic, such as to include arterial roads and collector roads that are primary alternatives to larger capacity roads such as freeways and major highways; based on functional class of the roads, such as is designated by the Federal Highway Administration; based on popularity of the roads in carrying traffic, such as to reflect actual driver behavior; etc.), or instead information may be tracked and/or determined for all roads. In addition, in some embodiments, traffic information is tracked and/or determined for some or all roads in one or more large regions, such as each of one or more states or countries (e.g., to generate nationwide data for the United States and/or for other countries or regions). In some such embodiments, all roads of one or more functional classes in the region may be covered, such as to include all interstate freeways, all freeways and highways, all freeways and highways and major arterials, all local and/or collector roads, all roads, etc.

Thus, a variety of types of traffic information may be tracked and/or determined in various embodiments, and may be used by particular embodiments of the DBA and/or RS systems in various manners. For example, as noted above, some embodiments of a DBA system may perform automated operations to identify road locations that are decision points at which two or more roads converge and/or diverge, with at least some such decision points providing drivers with two or more choices corresponding to possible alternative routes through the network of roads, and/or to track the actual use by drivers of particular paths between particular decision points, such as to determine preferred compound links between pairs of decision points based on actual driver behavior, with some or all such compound links each including multiple road links and/or multiple road segments. For example, in at least some embodiments, a DBA system may analyze historical road traffic information in order to identify particular routes that particular vehicles take through a network of roads at particular times (with each such particular vehicle route through a road network at a particular time referred to generally as a vehicle trip below), such as historical road traffic information that includes data from mobile data sources corresponding to those particular vehicles. As discussed in greater detail below, such historical vehicle trip information may be automatically analyzed by the DBA system to identify particular decision points, such as particular road locations at which different vehicle trips separate and/or join based on the vehicle drivers taking different alternative routes from those particular road decision point locations, and in some embodiments a subset of the identified decision points may be selected for further analysis (e.g., based on volume of total traffic through the decision point, such as to rank decision points based on traffic volume, and to select a particular quantity or percentage of decision points with the highest rankings; based on the relative vehicle traffic that chooses the various alternatives at the decision point, such as to rank decision points based on viability of at least two alternatives that are frequently used, and to select a particular quantity or percentage of decision points with the highest rankings; etc.).

In addition, after decision points have been identified and selected, the

DBA system may in some embodiments further automatically determine one or more compound links that each represent frequent paths followed in vehicle trips, with each compound link including a pair of decision points that represent the start and end of the compound link, and in many cases including one or more intermediate points between the starting and ending decision points at which traffic flow may change (e.g., other intermediate decision points, or instead other locations that involve traffic departing from or arriving at a road). Such an automated determination may include, for example, identifying the vehicle trips that occur between some or all pairs of selected decision points, and selecting particular pairs of decision points to represent the starting and ending points of such compound links. Such selecting of particular pairs of decision points for use with compound links may be performed in various manners in various embodiments, such as, for example, using one or more of the following: based on volume of total traffic between a particular pair of decision points, such as to rank such decision point pairs based on traffic volume, and to select a particular quantity or percentage of decision point pairs with the highest rankings; based on the relative lack of vehicle traffic that chooses any intermediate decision point(s) between a particular decision point pair, such as to rank such decision point pairs based on relative lack of use of alternatives at intermediate decision points, and to select a particular quantity or percentage of decision point pairs with the highest rankings; etc. Selected decision point pairs may then be used to identify starting and ending locations for compound links (e.g., with some or all such compound links each having a sequence of at least three decision points, including a starting decision point from the decision point pair, an ending decision point from the decision point pair, and one or more intermediate decision points) to enhance routing decisions, as discussed in greater detail below. Furthermore, various types of traffic-related measures may be assessed for some or all such compound links for one or more times or other categories (e.g., traffic conditions aggregation categories), such as average or other representative travel times, average or other representative traffic volumes, average or other representative variability in travel time or traffic volume or other measure, etc.

Furthermore, in at least some embodiments, the DBA system may perform automated operations to determine actual delays for vehicles that encounter various particular structural road features in the network of roads that create traffic flow impediments, such as delays associated with, for example, one or more of identified decision points, traffic signals, stop signs, on-ramp meters or other types of metered locations, toll stops, intersections, merge/join points, split/fork points, locations at which backups may occur during at least some times (e.g., off ramps, highway junctions, etc.), abrupt vehicle maneuver locations, etc. For example, as previously noted, a DBA system may in at least some embodiments analyze historical road traffic information in order to identify particular historical vehicle trips through the network of roads at particular times, and such historical vehicle trip information may be automatically analyzed by the DBA system to determine actual delays associated with particular traffic flow impediments. Such road features that create traffic flow impediments may be identified in various manners in various embodiments, such as to be supplied from one or more of various types of road data sources and/or to be automatically identified based at least in part on actual driver behavior, as discussed in greater detail below. As is also discussed in greater detail below, the DBA system may use historical vehicle trips to identify actual arrival times as vehicles approach a particular traffic flow impediment and actual departure times as vehicles move away from that traffic flow impediment, and information related to those actual arrival and departure times may be automatically analyzed to determine one or more actual delay times associated with that traffic flow impediment. The determined actual delay times associated with particular traffic flow impediments may further be used in enhancing routing decisions, as discussed in greater detail below, and are referred to generally as "actual delay times" and/or "actual turn costs" below.

Thus, as noted above, embodiments of the DBA system may automatically determine various traffic-related information based on actual driver behavior on roads of interest. Furthermore, as discussed in greater detail below, particular actual driver behavior may be influenced or otherwise affected in different manners under different conditions, including at different times and/or based on other conditions that affect traffic. Thus, for example, the actual use of particular decision points and particular compound links by drivers may vary under different time-based conditions or other types of conditions, and/or the actual delay times associated with particular traffic flow impediments may vary under different time-based conditions or other types of conditions. Similarly, the actual use of particular decision points and particular compound links by drivers may vary by other factors such as different types of vehicles and/or different types of user preferences of vehicle drivers, and/or the actual delay times associated with particular traffic flow impediments may vary under other factors such as different vehicles types and/or different types of driver preferences. Accordingly, in at least some embodiments, the DBA system may perform some or all of its automated determinations in manners that reflect such variances in actual driver behavior under different conditions and/or other factors, as discussed in greater detail below.

In addition, as previously noted, particular embodiments of an RS system may perform various automated operations in various manners, including based at least in part on information that is automatically generated by one or more DBA systems in at least some embodiments, such as information about selected decision points, selected compound links, and/or determined actual delay times. For example, some embodiments of an RS system may perform automated operations to determine particular recommended or preferred routes between locations in manners that are based at least in part on actual driver behavior information. As discussed in greater detail below, such operations of the RS system may include, for example, making routing determinations based at least in part by considering or using the most popular selected compound links (e.g., to select routes that correspond to actual driver preferences as expressed through previously selected routes for historical vehicle trips) and/or based at least in part by using actual delay times for particular traffic flow impediments associated with particular alternative routes. In addition, in at least some embodiments, preferred routes between various locations may be predetermined in the RS system and/or determined dynamically in response to requests.

Thus, information that is automatically generated by embodiments of the DBA system and/or the RS system may be used in various manners, including in some embodiments to provide information to drivers about particular preferred routes that are determined by the RS system, so as to affect future vehicle trips (e.g., by supplying the information directly to driver users, such as in response to a request for one or more particular route options between two locations; by supplying the information to navigation systems or other automated systems that use the information to influence driver behavior; etc.).

As noted above, particular actual driver behavior may be influenced or otherwise affected in different manners under different conditions and/or other factors, including at different times and/or based on other conditions that affect traffic. Accordingly, in at least some embodiments, traffic information for a particular road link or other portion of road is tracked and/or determined for each of one or more traffic conditions aggregation categories, such as for some or all road links or other road portions. In particular, in at least some embodiments, various time-based categories are used, and traffic information is separately tracked and/or determined for each of the time-based categories. As one example, time periods may be based at least in part on information about day-of-week and/or time-of-day (e.g., hour-of-day, minute-of-hour-of-day, etc.), such that each time-based category may correspond to one or more days-of-week and one or more times-of-day on those days-of-week. If, for example, each day-of-week and each hour-of-day are separately modeled with time-based categories, 168 (24*7) time-based categories may be used (e.g., with one category being Mondays from 9am-9:59am, another category being Mondays from 10 am-10:59 am, another category being Sundays from 9 am-9:59 am, etc.). In this example, traffic information for a road link and a particular time-based category, such as Mondays from 10 am-10:59 am, may be determined at least in part by aggregating historical traffic information that corresponds to that road link and category, such as for traffic conditions information reported for that road link on prior Mondays between 10am and 10:59am. Alternatively, a particular time-based category may include a grouping of multiple days-of-week and/or hours-of-day, such as if the grouped times are likely to have similar traffic conditions information (e.g., to group days of week and times of day corresponding to similar work commute-based times or non-commute-based times). A non-exclusive list of examples of day-of-week groupings include the following: (a) Monday-Thursday, Friday, and Saturday-Sunday; (b) Monday-Friday and Saturday-Sunday; (c) Monday-Thursday, Friday, Saturday, and Sunday; and (d) Monday-Friday, Saturday, and Sunday. A non-exclusive list of examples of time-of-day groupings include the following: (a) 6 am-8:59 am, 9 am-2:59 pm, 3 pm-8:59 pm, and 9 pm-5:59 am; and (b) 6 am-6:59 pm and 7 pm-5:59 am. Accordingly, one example group of time-based categories for which traffic information may be tracked and/or determined is as follows:

| Category | Day-Of-Week | Time-Of-Day |
| --- | --- | --- |
| 1 | Monday-Thursday | 6 am-8:59 am |
| 2 | Monday-Thursday | 9 am-2:59 pm |
| 3 | Monday-Thursday | 3 pm-8:59 pm |
| 4 | Monday-Thursday | 9 pm-5:59 am |
| 5 | Friday | 6 am-8:59 am |
| 6 | Friday | 9 am-2:59 pm |
| 7 | Friday | 3 pm-8:59 pm |
| 8 | Friday | 9 pm-5:59 am |
| 9 | Saturday-Sunday | 6 am-6:59 pm |
| 10 | Saturday-Sunday | 7 pm-5:59 am |

Furthermore, in some embodiments, time periods for time-based categories may be selected for time increments of less than an hour, such as for 15-minute, 5-minute, or 1-minute intervals. If, for example, each minute-of-day for each day-of-week is separately represented, 10,080 (60*24*7) time-based categories may be used (e.g., with one category being Mondays at 9:00 am, another category being Mondays at 9:01 am, another category being Sundays at 9:01 am, etc.). In such an embodiment, if sufficient historical data is available, traffic information may be determined for a particular road link and a particular time-based category using only historical traffic information that corresponds to that road link and the particular minute for the time-based category, while in other embodiments historical information for a larger time duration may be used. For example, for an example time-based category corresponding to Mondays at 9:01 am, historical information from a rolling time duration of one hour (or another time duration) surrounding that time may be used (e.g., on Mondays from 8:31 am-9:31 am, on Mondays from 8:01 am-9:01 am, on Mondays from 9:01 am-10:01 am, etc.). In other embodiments, periods of time may be defined based on other than time-of-day and day-of-week information, such as based on day-of-month, day-of-year, week-of-month, week-of-year, etc.

In addition, in at least some embodiments, the traffic conditions aggregation categories used for traffic information may be based on temporary or other variable conditions other than time that alter or otherwise affect traffic conditions, whether instead of or in addition to time-based categories. In particular, in at least some embodiments, various condition-based categories may be selected, and traffic information may be separately tracked and/or determined for each of the condition-based categories for one or more road links or other road portions. Each such condition-based category may be associated with one or more traffic-altering conditions of one or more types. For example, in some embodiments, traffic-altering conditions related to a particular road link or other road portion that are used for condition-based categories for that road link/portion may be based on one or more of the following: weather status (e.g., based on weather in a geographic area that includes the road link/portion); status regarding occurrence of a non-periodic event that affects travel on the road link/portion (e.g., based on an event with sufficient attendance to affect travel on the road link/portion, such as a major sporting event, concert, performance, etc.); status regarding a current season or other specified group of days during the year; status regarding occurrence of one or more types of holidays or related days; status regarding occurrence of a traffic accident that affects travel on the road link/portion (e.g., a current or recent traffic accident on the road link/portion or on nearby road links/portions); status regarding road work that affects travel on the road link/portion (e.g., current or recent road work on the road link/portion or on nearby road links/portions); and status regarding school sessions that affects travel on the road link/portion (e.g., a session for a particular nearby school, sessions for most or all schools in a geographic area that includes the road link/portion, etc.).

In a similar manner, in at least some embodiments, the aggregation categories used for traffic information may be based on factors other than time or other variable non-time conditions, whether instead of or in addition to time-based categories and/or categories based on other variable non-time conditions. In particular, in at least some embodiments, various categories may be selected based on one or more factors that include one of multiple vehicle types (e.g., electric vehicles, hybrid vehicles, diesel-based vehicles, gasoline-based vehicles, bicycles, motorcycles, mass-transit vehicles, non-electric vehicles, non-hybrid vehicles, non-diesel-based vehicles, non-gasoline-based vehicles, non-bicycles, non-motorcycles, non-mass-transit vehicles, etc.) and/or one of multiple types of driver behaviors (e.g., prefer route with shortest time, prefer route with shortest distance, prefer route with lowest variability in speed if its average or other representative speed is within a specified percentage or amount of the average shortest time on another route, prefer scenic routes, prefer to avoid highways, prefer to avoid tolls, prefer to avoid ferries, prefer to avoid timed restrictions, prefer routes that have or that do not have one or more specified types of facilities along the route, etc.), and traffic information may be separately tracked and/or determined for each of the factor-based categories for one or more road links or other road portions.

Thus, a given traffic flow impediment may have different associated turn cost delays for different aggregation categories (including to have no turn cost delays for some aggregation categories, such as to not be considered to be a traffic flow impediment for those aggregation categories), a given compound link between two decision points may have different traffic-related measure assessments for different aggregation categories, different alternative paths between two decision points may be selected as a preferred compound link for different aggregation categories, etc.

For illustrative purposes, some embodiments are described below in which specific types of road traffic information is analyzed to provide particular types of traffic-related output in specific ways, including to determine particular routes in particular manners based at least in part on particular types of traffic-related information identified using historical and/or current actual driver behavior information. However, it will be understood that such traffic-related information may be generated in other manners and using other types of input data in other embodiments, that the described techniques may be used in a wide variety of other situations, that other types of traffic-related information may similarly be generated and used in various ways, and that the invention is thus not limited to the exemplary details provided.

In at least some embodiments, the RS system may automatically determine and provide various types of route-related information, such as to enable various benefits. For example, in many classical routing situations, a driver desires to reach a particular destination location, and has little or no prior experience of preferred ways to get there. In such situations, the driver may desire to receive from a routing system the 'best path' to the destination, such as the fastest path and/or a path that otherwise satisfies one or more criteria (perhaps unexpressed) of the driver (e.g., a path with the lowest variability in speed, if within a specified amount of the average speed on the fastest path; a path that uses city streets rather than highway roads, such as to enable electric or hybrid vehicles to obtain better range or fuel efficiency; etc.). While the driver may not know whether a particular path route is faster than alternative routes, the driver may conclude that a route is non-intuitive if, for example, the route contains many turns, traffic lights, or tends to use slower roads (e.g., Functional Road Class (FRC) roads categorized at a level higher than FRC 2). In addition, if a routing system attempts to select a route without using actual driver behavior information in the described manners, a first route may be chosen that is calculated to be the fastest (even if it is just 1 millisecond faster than the alternatives), but which in actuality is less desirable to drivers than other alternative routes (e.g., because it requires more turns than an alternative, such as due to poor estimates of 'turn costs'; because it is actually slower than an alternative; because it has significant variability in speed under varying conditions; etc.). Conversely, by incorporating actual driver behavior information, such as in accordance with prior choices by actual drivers, embodiments of the RS system may select an alternative second route that is preferable to the driver than the first route, with the alternative second route potentially being faster than the first route and/or otherwise preferable to the first route based on one or more factors such as the vehicle type and/or driver preferences.

In addition, in other situations, drivers may have relatively detailed information about alternative routes to a destination, but lack useful information about how such alternative routes will compare under actual current conditions. For example, drivers performing their daily commute are typically aware of several alternative routes, and select the ones that they believe are best given current traffic conditions. In such situations, a driver might be aware if a route selected by a routing system is not typically optimal or is not optimal for some times, conditions and/or factors, because the driver will have experience with the average travel times on the selected route and the alternative routes. Furthermore, if such a routing system attempts to select a route without using actual driver behavior information in the described manners, such as actual delay times corresponding to traffic flow impediments based on current conditions, a first route may be chosen that is calculated to be the fastest, but which in actuality is less desirable to drivers than other alternative routes (e.g., because it is not actually the fastest). For example, consider a commute in which one alternative route includes a signalized ramp, and takes 15 minutes on average. If actual ramp wait time is likely to exceed 5 minutes under current conditions, but is incorrectly estimated at a much lower time (less than 1 minute), this inaccuracy (representing roughly 25-33% of the travel time) may result in an incorrect selection of that alternative route as currently being preferred, while another route may actually be faster (or otherwise preferred) under the current conditions. Furthermore, such ramp times and other delays associated with traffic flow impediments may be significantly underestimated by some routing systems, such as due to the removal of at-rest vehicle reports from historical speed reports, including based on GPS systems that report faulty travel headings when a vehicle is at rest, and/or based on the use of simple, global heuristics that ignore true, condition-dependent turn costs of particular impediments. Conversely, by incorporating actual driver behavior information, such as to reflect actual delays experienced by actual drivers for particular traffic flow impediments, embodiments of the RS system may select an alternative second route that is preferable to the driver than the first route, with the alternative second route potentially being faster than the first route.

Additional details regarding particular example embodiments for selecting compound links and determining actual delays for traffic flow impediments are included below. In addition, in at least some embodiments in which actual driver behavior information that is analyzed includes information about historical vehicle trips in which drivers previously made particular route selections, such previously selected routes may reflect both the most popular routes and the fastest possible routes, although in other embodiments prior actual driver behavior may instead reflect only one of those factors and/or may reflect other factors, whether in addition to or instead of the indicated factors.

In one particular example embodiment, decision points are identified as junctions along a linear (e.g., a named road) at which traffic divides or merges in a non-trivial fashion. Consider the travel paths for single vehicles, followed across a junction: if vehicle travel paths divide (or merge) into the alternative paths available at the junction at a particular rate, such as a rate that is greater than a threshold rate, then the junction may be identified as a decision point. This definition is designed to eliminate junctions in which, for example, more than 95% of traffic selects a single alternative at the junction, such as by setting a threshold of 5% in this example. Once the various decision points are identified in this manner, they are ranked in this example according to density of traversing historical vehicle trips, and the top N such decision points are selected for further use (with N being variable in different embodiments, such as to be configurable by an operator of the DBA system in at least some embodiments). The density of the traversing historical vehicle trips may be measured based on, for example, the frequency of historical vehicle trips.

After the various decision points have been identified and selected, particular compound links of interest may be identified. In some embodiments, for every pair of the selected decision points, the number of single vehicle trips between those two decision points is counted, and at least some such decision point pairs may be discarded from further consideration if one or more specified criteria are met or not met (e.g., if the number of single vehicle trips is below a minimum amount, if multiple alternative paths between a decision point pair each include a minimum percentage or minimum quantity or other minimum amount of the single vehicle trips, if one or more of multiple alternative paths between a decision point pair do not each include a minimum percentage or minimum quantity or other minimum amount of the single vehicle trips, if one or more of multiple alternative paths between a decision point pair do not each satisfy one or more other specified criteria based on speed variability or volume, etc.). The various decision point pairs are then rank ordered (e.g., by traffic density, such as measured by frequency of historical vehicle trips), and the top M decision point pairs are selected for further use (with M being variable in different embodiments, such as to be configurable by an operator of the DBA system in at least some embodiments). When a selected decision point pair is separated by multiple alternative paths, but a single one of those alternative paths is sufficiently preferred based on actual driver behavior (e.g., used by at least a minimum percentage or other minimum amount of prior vehicle trips between the decision points of the selected pair, at least under a combination of one or times, conditions and/or factors), that single alternative path represents a compound link that may be used by an embodiment of the RS system as a shortcut to enhance the speed and/or reliability of the computation of a preferred route that includes those decision points of that pair (at least under the same combination of one or times, conditions and/or factors), by assuming that a route with such a compound link will move between the decision points along the compound link without considering any alternative routes. In some embodiments and situations, a selected decision point pair may include one or more intermediate decision points, such that alternative paths between the decision points of the pair may include paths that share a common portion but that deviate at one or more such intermediate decision points. In addition, in at least some embodiments, particular selected compound links may be categorized in various manners, and then used in situations corresponding to that categorization. For example, a particular selected compound link may be frequently used at particular times (e.g., weekdays from 8 am to 10 am), and may be categorized as being associated with those times, such that an embodiment of the RS system may consider that selected compound link for use as a shortcut for trips during those associated times but not at other times. Similarly, a particular selected compound link may be categorized on one or more non-time factors, such as being frequently used by a particular type of vehicle or driver (e.g., by bicycles, by Toyota Prius vehicles, by drivers identified as hypermilers, etc.), and if so may be used by an embodiment of the RS system as a possible shortcut for trips corresponding to those one or more factor-based categories (e.g., by trips by those types of vehicles and/or drivers). It will be appreciated that selected compound links may be categorized and used in a variety of other similar manners in other embodiments. Additional details related to determining preferred compound links associated with decision point pairs based on prior vehicle trips are included below, including with respect to FIG. 6A.

In one particular example embodiment, the RS system employs a modified Dykstra path optimization algorithm (e.g., the A* algorithm), optionally using information about current traffic conditions and/or predicted future traffic conditions, and identifies a preferred route between two locations by working toward the middle from both the source and destination location points. This RS system embodiment may be configured to enhance the determination of routes by taking advantage of the determined compound links within the network of roads, such as to avoid searching infrequently used side streets or other types of alternative routes for intermediate decision points of the determined compound links that are used. While such compound links may not in some situations be guaranteed to be part of the best route between two locations, such "crowd-sourced" paths may be considered first by at least some RS system embodiments, such as to reflect the popularity of the compound links.

In addition, some embodiments of the RS system may set and use routing priorities for selected compound links as part of determining preferred routes. In particular, as previously noted, at least some embodiments of the RS system may search for one or more preferred routes between two locations from both the origin and destination, investigating nearby roads, and meeting in the middle. However, as the search gets closer to the middle, "high priority" roads may be given precedence for the investigating (e.g., by searching the high priority roads first, by searching only the high priority roads, etc.). Such techniques reduce search times on alternative paths that are unlikely to be in the preferred route(s), such as by ensuring that the preferred route takes advantage of compound links if possible and/or takes advantage of high-throughput roads in the middle of the route if possible, while possibly using smaller roads nearer the source and destination. To assist such techniques, roads are classified with 'priority' values, such as based on FRC levels (e.g., with the highest priority of 1 for roads with FRC levels 1 or 2, with a lower priority of 2 for roads with FRC level 3, etc.), and the priority values are used to select appropriate roads for different parts of the preferred route(s). Unfortunately, default road prioritizations in typical map data are insufficient, such as by having roads that are improperly prioritized lower or higher than they should be, as well as not reflecting short cuts frequently taken by drivers familiar with a road network. Embodiments of the RS system may instead use actual driver behavior information to identify such short cuts and to fix FRC classification errors based on actual traffic volumes reflected in historical traffic information, for both free flow and congested conditions. Such road prioritization may be performed at run-time when making routing determinations (e.g., in response to requests and particular current traffic conditions) and/or in advance (e.g., for some or all possible traffic conditions), and may include reviewing the road(s) associated with each selected compound link to ensure accuracy in FRC levels and corresponding prioritization.

In addition, in one particular example embodiment, the DBA system determines actual travel time costs for traffic flow impediments, such as actual delays in travel time resulting from, for example, abrupt maneuvers, intersections, traffic signals, signalized ramps, etc. As previously noted, turn cost delays used by prior routing systems are typically inaccurate. Instead, in this particular example embodiment, the DBA system aggregates single-vehicle travel paths that traverse a traffic flow impediment, and analyzes those travel paths to determine the average actual time spent at the traffic flow impediment. In particular, data samples corresponding to locations on either side of a traffic flow impediment are used to compute average travel times for traversing the location of the traffic flow impediment. For a particular vehicle travel path, the turn cost delay associated with the traffic flow impediment may then be identified as the total traversal time for this vehicle that is associated with the location of the traffic flow impediment, and such turn cost delays may be averaged over large numbers of such vehicle travel paths to determine an actual delay associated with the traffic flow impediment. As with compound links, in at least some embodiments, the determined delay times for some or all traffic flow impediments may be categorized in various manners, and then used in situations corresponding to that categorization. For example, a particular determined delay time for a particular traffic flow impediment may correspond to traversal of that traffic flow impediment at particular times (e.g., weekdays from 8 am to 10 am), and may be categorized as being associated with those times, such that an embodiment of the RS system may consider that delay time for that traffic flow impediment for trips during those associated times but not at other times. Similarly, a particular determined delay time for a particular traffic flow impediment may be categorized on one or more non-time factors, such as being frequently used by a particular type of vehicle or driver (e.g., by bicycles, by Toyota Prius vehicles, by drivers identified as hypermilers, etc.), and if so may be used by an embodiment of the RS system when determining travel times for trips that include that traffic flow impediment and that correspond to those one or more factor-based categories (e.g., by trips by those types of vehicles and/or drivers). It will be appreciated that determined delay times for traffic flow impediments may be categorized and used in a variety of other similar manners in other embodiments. Additional details related to determining actual delays associated with traffic flow impediments based on prior vehicle trips are included below, including with respect to FIGS. 6B and 6C.

Figure 6B:
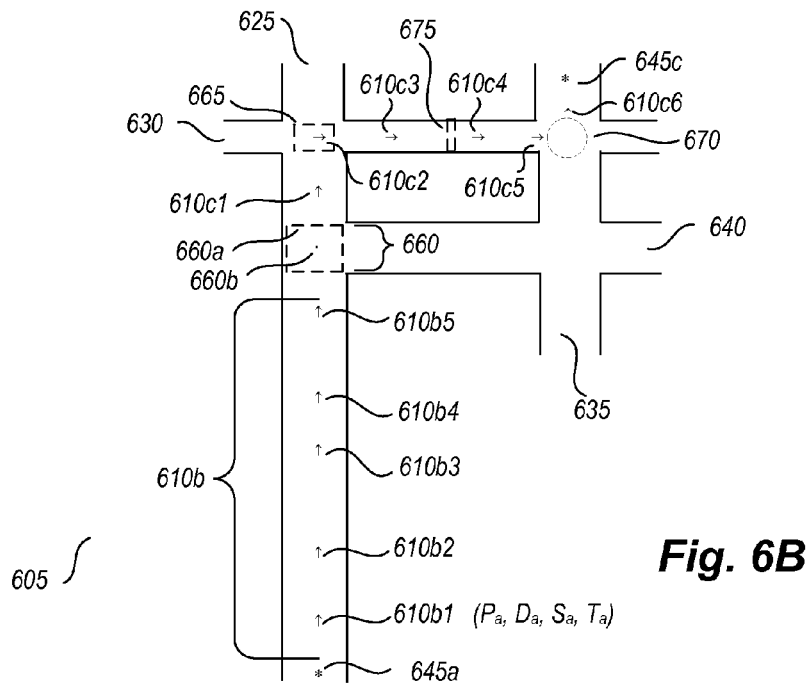
FIGS. 6A-6C illustrate examples of using information about actual driver behavior corresponding to decision points and traffic flow impediments.
Figure 6A:
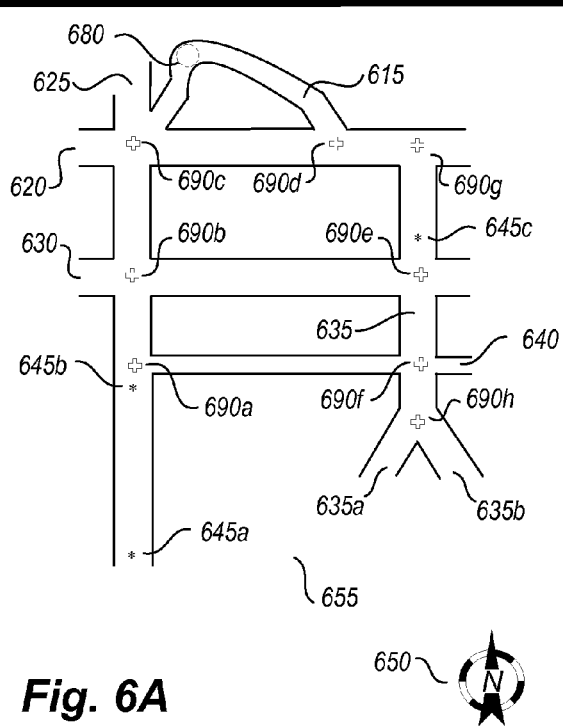
Figure 6C:
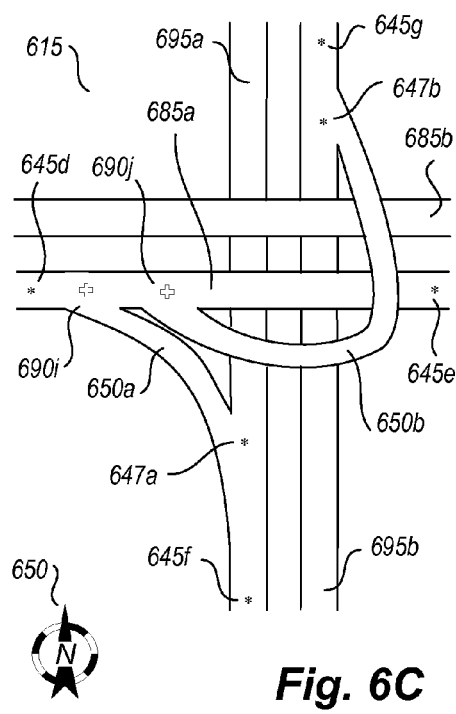

FIGS. 6A-6C illustrate examples of using information about actual driver behavior corresponding to decision points and traffic flow impediments. In particular, in these illustrated examples, only a few roads and a single vehicle traveling a short distance are discussed for illustrative purposes, but it will be understood that in some embodiments and situations a network of connected roads in a geographic area may include hundreds or thousands or more roads of various types (e.g., freeways and other highways, arterials and other city streets, etc.), that thousands or millions or more of distinct prior vehicle trips may be tracked and analyzed, that thousands or millions or more of distinct traffic flow impediments may be identified and analyzed, that thousands or millions or more of distinct decision point pairs may be analyzed, that thousands or millions or more of distinct compound links may be determined and analyzed, that thousands or millions or more of distinct traffic flow impediments may be identified and analyzed, that particular vehicle trips may include tens or hundreds or more miles, etc.

In particular, FIG. 6A depicts an example area 655 with several interconnected roads 615, 620, 625, 630, 635 and 640, and with an illustrated directionality legend 650 that indicates the direction of North for the roads (with roads 625 and 635 running in a north-south direction, with roads 620, 630 and 640 running in an east-west direction, with road 635a running in a roughly northeast-southwest direction, with road 635b running in a roughly northwest-southeast direction, and with road 615 curving throughout its length). While only a limited number of roads are indicated and are generally shown using straight lines in this example, they may optionally represent a large geographic area in which some roads are not shown, such as to illustrate interconnected freeways over numerous miles, or to illustrate a subset of city streets spanning numerous blocks, and/or may correspond to roads with various curves or other non-straight portions. A variety of decision points 690 are shown in this example that each correspond to a connection of two or more roads, with each decision point identifying a location at which traffic may diverge and/or converge. In at least some situations, a decision point may correspond to a location at which a driver of a vehicle faces a choice of two or more alternative paths leaving that location for at least some drivers. For example, if road 625 includes two-way traffic and road 640 includes one-way traffic in the westward direction, traffic that is moving along road 640 to the road intersection for decision point 690*a* will have alternatives to depart from that decision point 690*a* by going north on road 625 (after a right turn) or by going south on road 625 (after a left turn), while traffic that is moving along road 625 to that same road intersection for decision point 690*a* will not have alternatives for leaving that decision point (unless there is an ability to execute a U-turn at the intersection, thus providing the choice of continuing straight or turning around). Similarly, traffic traveling along roads 635*a* and/or 635*b* toward decision point 690*h* may not have a choice other than merging into northbound traffic along road 635, while southbound traffic along road 635 that reaches decision point 690*h* may or may not have the alternative of selecting either of roads 635*a* and/or 635*b*—in addition, in such merge/split connections of roads as corresponds to decision point 690*h*, in some situations one of the roads 635*a* and 635*b* may be considered to be the same road as 635, while in other situations all three of the roads 635, 635*a* and 635*b* may be considered to be distinct roads. While such decision points and alternative choices may be determined by some embodiments of a driver behavior analysis system based on analyzing map data and/or based on manual input, in other embodiments such determinations may be made automatically by analyzing large numbers of prior vehicle trips, such as to determine that traffic along road 625 in the example above does not turn onto road 640 (or turns onto road 640 less than a specified minimum threshold), and thus does not include a driver choice of alternative departure paths, while traffic along road 640 in this example does diverge into two alternative departure paths from the identified decision point 690*a*.

In the example of FIG. 6A, a mobile data source (e.g., a vehicle, not shown) may desire to travel from location 645*a* to 645*c*, and if so may have multiple alternative paths between those locations. For these example roads, all of the alternative paths will travel through intermediate location 645*b* and reach the first decision point 690*a* at intersection A where roads 625 and 640 connect, with the road connection corresponding to a decision point 690*xx* being referred to as "intersection XX" for the purpose of this discussion (such that the road connection at decision point 690*a* is referred to as "intersection A"). In addition, all of the alternative paths in this example will have either intersection E or intersection G as the last decision point, with the path continuing either northward from intersection E to location 645*c* or southward from intersection G to location 645*c*. Using only the illustrated roads of this example, and assuming that all of the illustrated roads are two-way roads, the multiple alternative paths between the pair of locations 645*a* and 645*c* include the following non-exclusive list of alternatives: intersections A to F to E; intersections A to F to E to B to C to D to G; intersections A to B to E; intersections A to B to C to D to G, using road 620 between C and D; intersections A to B to C to D to G, using road 615 between C and D; etc. It will be appreciated that the numbers of alternatives can grow exponentially as additional roads are included for consideration. In addition, depending on driver choices at particular decision points, one choice may be part of an alternative path between a pair of locations while another choice may not—for example, if road 640 comes to a dead end to the east of road 635 without reconnecting with any other roads, the choice to leave intersection F in an eastbound direction along road 640 would not be part of an alternative path between the pair of locations 645*a* and 645*c*.

In order to facilitate the generation of preferred routes through the area in this example, information about actual driver behavior on these roads may be analyzed, such as to determine preferred compound links between pairs of decision points. While information about a plurality of vehicle trips corresponding to such actual driver behavior is not illustrated in FIG. 6A, it will be appreciated that such data may be stored and/or displayed in various manners in various embodiments, such as to represent each vehicle trip with a series or sequence of road locations (and optionally other information, such as associated time, speed, etc.) at which the vehicle for the trip was sampled or otherwise identified, and/or to display a trace for each vehicle trip that includes a line from the start location of the vehicle trip (or from where the vehicle trip enters the displayed example area of roads, if the start location is outside of the displayed area) to the end location of the vehicle trip (or to where the vehicle trips exits the displayed example area of roads, if the end location is outside of the displayed area). Consider, for example, a situation in which all of the displayed roads carry two-way traffic, and in which roads 625 and 630 correspond to arterials, while road 640 corresponds to a small side street. In such a situation, a large majority of the prior vehicle trips between intersections A and E (i.e., between the decision point pair including decision points 690*a* and 690*e*) may pass along roads 625 and 630 through intermediate decision point 690*b*, and if so that alternative path may be determined to be a compound link for that decision point pair. Thus, in such a situation, a preferred route between locations 645*a* and 645*c* may be generated that uses that determined compound link between intersections A and E without considering any alternative paths between those intersections. Conversely, if one or both of roads 625 and 630 have significant traffic congestion and/or variability in speeds or traversal times at certain times (e.g., during rush hour), a significant amount of traffic may instead use a second alternative path that includes roads 640 and 635 during those times—for example, the amount of traffic along that second alternative path may be a majority of prior vehicle trips that occur during those times, or may be a minority of prior vehicle trips that is above a specified minimum threshold. If so, that second alternative path may also be determined to be a compound link for that decision point pair, at least for those certain times. In addition, in some embodiments, a given decision point pair (such as for decision points 690*a* and 690*e*) may be directional (e.g., to include prior vehicle trips that travel from decision point 690*a* to decision point 690*e* but not that travel from decision point 690*e* to decision point 690*a*), while in other embodiments such decision point pairs are not directional. Furthermore, while some alternative paths between a pair of decision points may include one or more intermediate decision points along the path, such as for each of the alternative paths for the decision point pair of 690*a* and 690*e*, in some situations there may be multiple alternative paths between two decision points that do not include any intermediate decision points, such as alternative paths between the pair of decision points 690*c* and 690*d* using either road 620 or road 615.

Thus, as illustrated in the examples of FIG. 6A, a variety of types of decision points may be identified and used in various manners in various embodiments.

In a manner similar to FIG. 6A, FIG. 6B depicts an example area 605 that is a subset of the area 655 of FIG. 6A, but does not illustrate the decision points 690 of FIG. 6A. In addition, FIG. 6B further includes information about a particular vehicle trip for a vehicle associated with the mobile data source that travels from location 645*a* to location 645*c*—in particular, in this example, the illustrated vehicle trip travels over the interconnected roads 625, 630 and 635 along a path from location 645*a* to 645*c* that includes intersections A, B and E of FIG. 6A, such as over a period of ~11-12 minutes. The mobile data source acquires a data sample along the vehicle trip approximately every minute in this example, with the eleven data samples 610 illustrating examples of such data samples. In this example, each data sample includes an indication of current position (e.g., in GPS coordinates), current direction (e.g., northbound), current speed (e.g., 30 miles per hour), and current time, as represented for the 610*b*1 data sample using data values $P_a$, $D_a$, $S_a$ and $T_a$, and may optionally include other information as well (e.g., an identifier to indicate the mobile data source), although in other embodiments may include other information (e.g., just a location position and associated time). In addition, in this example, the set 610*b* that includes the first five data samples 610*b*1-610*b*5 corresponds to travel of the mobile data source before the first decision point along the vehicle trip (decision point 690*a* of FIG. 6A) is reached, while the six data samples 610*c*1-610*c*6 correspond to continuing travel of the mobile data source after the first decision point.

Thus, in the example of FIG. 6B, the actions of a particular mobile device in obtaining and providing information about travel of a corresponding vehicle during a vehicle trip is illustrated, such as to report locations and associated times (or more generally road traffic conditions) of the vehicle during the vehicle trip. The mobile device may, for example, be part of the vehicle (e.g., associated with a navigation system of the vehicle), or may be carried by the driver or a passenger of the vehicle (e.g., as part of a smart phone or other cell phone or handheld device). Information about travel of a mobile device (and of corresponding travel of an associated vehicle, if any) may be obtained from the mobile device in various ways, such as by being transmitted using a wireless link (e.g., satellite uplink, cellular network, WI-FI, packet radio, etc.) and/or physically downloaded when the device reaches an appropriate docking or other connection point (e.g., to download information from a fleet vehicle once it has returned to its primary base of operations or other destination with appropriate equipment to perform the information download). While information about road traffic conditions at a first time that is obtained at a significantly later second time provides various benefits, such as may be the case for information that is physically downloaded from a device after it arrives at a destination, such road traffic condition information can provide additional benefits when obtained in a realtime or near-realtime manner. Accordingly, in at least some embodiments, mobile devices with wireless communication capabilities may provide at least some acquired information about road traffic conditions on a frequent basis, such as periodically (e.g., for a period of every 30 seconds, every 1 minute, every 5 minutes, etc.) and optionally to correspond to acquisition of a data sample for each such period, and/or when a sufficient amount of acquired information is available (e.g., for every acquisition of a data point related to road traffic condition information; for every N acquisitions of such data, such as where N is a configurable number; when the acquired data reaches a certain storage and/or transmission size; etc.).

With respect to the example of FIG. 6B, the eleven data samples 610 are each indicated in this example with an associated arrow pointed in the direction of the mobile data source at the time of the data sample, and may be used to assess various information. For example, as is visually indicated, the data samples 610 enable determination of the particular route followed as part of the vehicle trip, such as to travel along road 630 rather than road 640. In addition, various of the data samples 610 may be used to assess actual delays of the vehicle during the vehicle trip at each of multiple traffic flow impediments 660-675. In particular, in this example, the route followed during the vehicle trip passes four traffic flow impediments, with traffic flow impediments 660, 665 and 670 corresponding to intersections A, B and E of FIG. 6A and corresponding decision points 690*a*, 690*b* and 690*e*. The traffic flow impediment 675 of FIG. 6B corresponds to a road feature that is not an intersection or otherwise a decision point, such as a mid-block crosswalk with traffic signal. The traffic flow impediment 680 of FIG. 6A is also a road feature that is not an intersection or otherwise a decision point, and in particular corresponds to a road location that causes abrupt vehicle maneuvers corresponding to a reduction in speed of a traversing vehicle, although traffic flow impediment 680 is not used by the example route of FIG. 6B.

The example traffic flow impediments 660, 665, 670 and 675 of FIG. 6B illustrate that traffic flow impediments may have various shapes in various embodiments and situations. For example, in at least some embodiments, a traffic flow impediment may be represented as a point location, such as to represent the traffic flow impediment 660 for intersection A as a point location 660*b*. Alternatively, in at least some embodiments, a traffic flow impediment may be represented as a geographic area surrounded by a boundary, such as for boundary 660*a* of traffic flow impediment 660. In addition, while the example boundary 660*a* corresponds to the dimensions of the corresponding intersection A, and the illustrated boundary of traffic flow impediment 675 may correspond to the dimensions of the corresponding mid-block crosswalk, traffic flow impediments may have boundaries of other types in other embodiments and situations, such as the illustrated boundary of traffic flow impediment 665 that corresponds to a rectangular subset of the area of the corresponding intersection B, the illustrated boundary of traffic flow impediment 670 that corresponds to a circular subset of the corresponding intersection E, a boundary (not shown) of a traffic flow impediment that extends beyond the geographic area of the traffic flow impediment (e.g., to represent an additional geographic area in which traffic backs up for the traffic flow impediment during at least some times), etc. The circular boundary of traffic flow impediment 670 may be determined, for example, based on a predefined radius distance from a point location (not shown) at the center of intersection E, based on an actual circular road feature at the intersection E (e.g., a roundabout or other traffic circle), etc.

The data samples 610 for the vehicle trip may be used to assess the traffic flow impediments 660, 665, 670 and 675 in various manners in various embodiments and situations, including in manners that reflect the shapes of the traffic flow impediments. For example, consider the traffic flow impediment 660 and the traversal of that traffic flow impediment by the vehicle during the vehicle trip. In order to assess an actual delay associated with the traffic flow impediment 660 for the vehicle trip, the two data samples surrounding the traffic flow impediment may be selected, which in this example are data sample 610*b*5 before the traffic flow impediment and data sample 610*c*1 after the traffic flow impediment. Given the road locations and associated times for these two data samples, an actual distance between those road locations may be determined and an actual amount of time that was spent traversing that distance during the vehicle trip may be determined. However, because the exact times that the vehicle first entered the geographic area for the traffic flow impediment 660 (e.g., the south side of the boundary 660*b*) and later departed that geographic area (i.e., the north side of the boundary 660b) are not known (since data samples corresponding to those exact locations are not available in this example), the exact amount of time that the vehicle spent traversing the geographic area for the traffic flow impediment cannot be directly calculated in this example.

Instead, in some embodiments, a first amount of time that the vehicle did spend or would typically spend traveling a first distance from the location of the first data sample 610b5 to the geographic area of the traffic flow impediment may be estimated, a second amount of time that the vehicle did spend or would typically spend traveling a second distance from the geographic area of the traffic flow impediment to the location of the second data sample 610c1 may be estimated, and those estimated first and second amounts of time may be deducted from the total actual amount of time that was spent traversing the total distance between the locations of the two surrounding data samples, with the resulting numerical difference representing an estimated actual delay time amount that the vehicle spent traversing the geographic area of the traffic flow impediment. For example, the first amount of time corresponding to the vehicle arriving at the geographic area of the traffic flow impediment may in some embodiments be estimated by using an average speed of traffic on road 625 (e.g., an average speed for any location and time on road 625, or instead an average speed corresponding to the vehicle trip, such as for a corresponding time, near the location of the traffic flow impediment, etc.) for the corresponding distance between the data sample 610b5 location and the edge of the geographic area, or instead by using a speed specific to the vehicle for that corresponding distance (e.g., based on a speed value reported with the data sample 610b5, based on an average speed traveling from the location of adjacent preceding data sample 610b4 to the location of data sample 610b5). In a similar manner, the second amount of time corresponding to the vehicle departing the geographic area of the traffic flow impediment may in some embodiments be estimated by using an average speed of traffic on road 625 and/or a speed specific to the vehicle (e.g., based on a speed value reported with the data sample 610c1, based on an average speed traveling from the location of data sample 610c1 to the location of adjacent subsequent data sample 610c2) for the corresponding distance between the edge of the geographic area and the data sample 610c1 location. In situations in which the geographic area of the traffic flow impediment is represented as a point location (e.g., by the point location 660b) and in which the same speed is used for the first and second amounts of time, the determination of estimated actual delay time amount associated with the traffic flow impediment for the vehicle may be determined by applying that speed to the total distance between the surrounding data samples 610b5 and 610c1, and deducting that amount from the actual total time spent traveling between the road locations of the surrounding data samples 610b5 and 610c1. Thus, in cases in which average speed for the road is used or an expected amount of time for the vehicle to travel the first and second distances is otherwise determined, it is possible for the estimated actual delay time amount associated with the traffic flow impediment for this particular vehicle trip to be negative (e.g., if the actual traversal of the distance between the road locations of the surrounding data samples 610b5 and 610c1 by the vehicle is significantly faster than typical).

The traversal of the other traffic flow impediments 665, 670 and 675 by the vehicle during the vehicle trip illustrates other examples in which actual turn cost delays for those traffic flow impediments may be estimated based on the data samples for the vehicle trip. For example, traffic flow impediment 665 illustrates a situation in which the geographic area of the traffic flow impediment is represented by the illustrated boundaries, and in which one of the data samples (data sample 610c2) is reported from within that geographic area. In such a situation, a determination similar to that previously discussed for traffic flow impediment 660 may be applied, but with the surrounding data samples 610c1 and 610c3 being selected for use with traffic flow impediment 665, and with information from intermediate data sample 610c2 such as an associated speed optionally being used to assist in determining a vehicle-specific speed if it is used instead of an average speed (e.g., an average of the average speeds for roads 625 and 630; the average speed for one of the roads 625 and 630, such as to select the higher average speed or the lower average speed; etc.). In addition, in some embodiments, a particular vehicle trip may be excluded for use in determining actual turn cost delays for a particular traffic flow impediment for various reasons, such as if one or both of the surrounding data samples for the traffic flow impediment are beyond a specified minimum distance, or if the data samples otherwise satisfy or fail to satisfy one or more specified criteria that reflect a possible lack of reliability of those data samples for the determining—for example, surrounding data sample 610c3 may be determined to be too far from traffic flow impediment 675 in this example, such that this vehicle trip is not used for determining the actual turn cost delays for that traffic flow impediment. Furthermore, in some embodiments, if one or both of the surrounding data samples for a traffic flow impediment are sufficiently close to the geographic area of that traffic flow impediment, such as by being within a minimum threshold distance, the actual distance between the road locations of those data samples may be used to represent that geographic area for that vehicle trip, such that the actual time spent traveling between the surrounding data samples is selected to represent the actual time that the vehicle spent traversing that traffic flow impediment for that vehicle trip, without calculating one or both of the first and second time amounts as previously discussed with respect to traffic flow impediment 660—for example, surrounding data samples 610c5 and 610c6 may be determined to be sufficiently close to the geographic area of traffic flow impediment 670 in this example that the actual time between those surrounding data samples is used for the traversal of traffic flow impediment 670. It will be appreciated that various other related situations may arise and be handled in similar manners.

FIG. 6C depicts an example area 615 that illustrates a particular connection of multiple roads, which may, for example, correspond to a subset of the area 655 of FIG. 6A, or may instead be a distinct area. In particular, in the example of FIG. 6C, two highways 685 and 695 connect at an interchange, with highway 685 including an eastbound set of one or more lanes 685a and a westbound set of one or more lanes 685b, and with highway 690 including a northbound set of one or more lanes 695b and a southbound set of one or more lanes 695a. A portion of the interchange is shown, including one or more merge lanes 650a from eastbound 685a to southbound 695a, and one or more merge lanes 650b that are part of a flyover from eastbound 685a to northbound 695b. In some embodiments, lanes 685a and 685b will be represented as a single road 685, while in other embodiments lanes 685a and 685b will be represented as separate roads that may have distinct decision points and/or traffic flow impediments—in a similar manner, lanes 695a and 695b may be represented as a single road 695 or as separate roads that may have distinct decision points and/or traffic flow impediments. In this example, lanes 685a and 695a are treated are being separate form lanes 685b and 695b, respectively, for the purposes of decision points and traffic flow impediments. In addition, merge/connection lanes 650a and 650b may be represented in various manners in various embodiments, such as to alternatively treat lanes 650a as being separate from the roads for both lanes 685a and 695a, as being part of the roads for both lanes 685a and 695a, or as being part of only one of the roads for both lanes 685a and 695a (e.g., for the origination lanes 685a, or for the destination lanes 685b)—lanes 650b may similarly be represented in different manners in different embodiments.

In this example, consider a vehicle that is traveling eastbound on lanes 685a at location 645d and that is approaching the interchange connection with highway 695. In this situation, the vehicle faces three possible choices at the interchange, including going straight past highway 695 to reach location 645e (and beyond) on lanes 685a on the east side of highway 695 past the interchange, joining southbound lanes 695a via lanes 650a to reach location 645f (and beyond) on lanes 695a south of the interchange, and joining northbound lanes 695b via lanes 650b to reach location 645g (and beyond) on lanes 695b north of the interchange. In some embodiments, these three choices will be represented with a single decision point on lanes 685a, although in the illustrated example two distinct decision points 690i and 690j are instead shown that correspond to the decisions at lanes 650a and 650b, respectively, such as if backups or other delays may be identified separately for traffic using lanes 650a, 650b, and/or 685a as they continue straight past highway 695. In some embodiments, the merge locations 647a and/or 647b may further be identified as decision points, but are not identified as such in this example. In addition, traffic flow impediments may be identified in various manners, including to have a separate traffic flow impediment for each decision point that is represented, to have a single traffic flow impediment for vehicles on lanes 685a at the interchange (e.g., to encompass both of the decision points 690i and 690j, to have a single traffic flow impediment for the entire interchange, etc. In addition, while point locations or other boundaries for such traffic flow impediments are not illustrated in this example, those boundaries may be selected in various manners, such as to have a traffic flow impediment that corresponds to lanes 650a and/or decision point 690i that has a corresponding boundary that includes lanes 650a (e.g., to include the area between decision point 690i and location 647a)—if lanes 650a are not represented as part of either road 685 or 695 (e.g., as part of lanes 685a and/or 695a), the geographic boundaries of such a traffic flow impediment may thus optionally not include any of the geographic area of either of those roads, although in other embodiments may also include a portion of one or both of such roads (e.g., to include a portion of lanes 685a that correspond to locations at which traffic that is traveling along lanes 685a toward lanes 650a may backup during at least some times). In other embodiments and situations, the geographic boundaries for a traffic flow impediment for lanes 650a may generally encompass some or all of locations 645d, 645f, 645e and 645g. In a similar manner, the boundaries for a traffic flow impediment that corresponds to lanes 650b and/or decision point 690j may have a corresponding boundary that includes lanes 650b (e.g., to include the area between decision point 690j and location 647b), even if that boundary overlaps with locations associated with highways 695 and/or 685, or more generally may encompass some or all of locations 645d, 645f, 645e and 645g. Thus, the various techniques described elsewhere for identifying decision points, determining compound links between decision point pairs, determining assessments of traffic measures for determined compound links, identifying traffic flow impediments, and/or determining actual turn cost delays for identified traffic flow impediments may similarly be applied to connections of roads illustrated in FIG. 6C, including based on numerous vehicle trips that travel through or past the interchange.

Thus, as described above, the actual turn cost delays associated with vehicles traversing a traffic flow impediment may be determined in various manners in various embodiments. In at least some embodiments, locations of each traffic flow impediment are first determined (whether point locations or boundaries that encompass a geographic area), and then the obtained information for each vehicle trip that passes the traffic flow impediment is analyzed to estimate or otherwise determine an estimated amount of time associated with the traffic flow impediment for the vehicle trip, such as by determining the difference between a first time at which the vehicle for that vehicle trip arrives at the location of the traffic flow impediment and to determine a second time at which the vehicle for that vehicle trip departs from the location of the traffic flow impediment, or more generally by deducting the expected time of the vehicle traversing some or all of a distance that encompasses the traffic flow impediment from a total time of the vehicle actually traversing that distance during the vehicle trip.

With respect to determining location boundaries of traffic flow impediments, the determination may be performed in various manners in various embodiments. For example, in some embodiments, the boundaries may be specified or configured by an operator of the DBA system, such as to individually define a particular boundary for each traffic flow impediment, to define a default boundary for traffic flow impediments of a particular type (e.g., for an intersection of two roads, at the edges of where the roads intersect, or a square centered at the middle of the intersection and having sides of fifty feet or another specified distance), etc. In other embodiments, the boundaries of at least some traffic flow impediments may be defined by underlying map data, such as if an intersection is represented with its own road link separate from other road links adjacent to the intersection, if the exact location of on ramps and off ramps are defined in the map data, etc. In addition, in some embodiments and situations, the boundaries of at least some traffic flow impediments may be automatically determined based at least in part on actual prior driver behavior information, such as to represent the beginning of an intersection as a distance at which traffic waiting at a traffic light or sign for the intersection begins to back up, as may be automatically detected by differences in speeds by vehicles as they near the intersection during at least some times and/or other conditions—in such embodiments and situations, it will be appreciated that the entrance boundary to an intersection or other traffic flow impediment with backups may vary at different times, such as to have different boundaries for different aggregation categories or otherwise at different times.

With respect to determining estimated traversal time associated with a particular traffic flow impediment by a vehicle during a vehicle trip, the determination may be performed in various manners in various embodiments. For example, if the vehicle trip is represented with a series or sequence of data samples that are separated from each other with respect to road location and associated time, the vehicle trip will in some situations have a particular data sample whose associated road location is sufficiently close to a boundary of the traffic flow impediment (e.g., within a first predefined distance) that the associated time for that data sample is used as the arrival or departure time (depending on which boundary the location matches). Conversely, in some situations and embodiments, none of the data samples for the vehicle trip will have an associated road location that is sufficiently close to a boundary of the traffic flow impediment (e.g., within a second predefined distance), and if so that vehicle trip may not be used to calculate a delay time for that traffic impediment, such as to exclude that vehicle trip for that traffic flow impediment. More generally, in at least some embodiments and situations, the vehicle trip will have a first data sample whose associated road location is some first distance before a traffic flow impediment boundary at a first time and a second data sample whose associated road location is some second distance past that traffic flow impediment boundary at a second time—in such situations, information about the vehicle trip may be used to automatically estimate a time between the first and second times when the vehicle's location is estimated as having reached that traffic flow impediment boundary (e.g., via interpolation), and that estimated intermediate time is used as the start/arrival or end/departure time (depending on to which boundary the locations correspond). The estimation of the intermediate time for the boundary location in such situations may be performed in various manners in various embodiments, such as to use an average speed for that road location, to use a posted maximum speed for that road location, to use vehicle-specific speed location associated with one or more data samples for the vehicle trip, etc. After such a traversal time is calculated for each vehicle trip and traffic flow impediment of interest, the traversal times for numerous vehicle trips may be averaged or otherwise aggregated for a particular traffic flow impediment in order to determine one or more representative actual turn cost delays for that traffic flow impediment, optionally for one or more aggregation categories, as discussed in greater detail elsewhere.

It will be appreciated that the particular details described above with respect to the example DBA and RS system embodiments are for illustrative purposes, and that other DBA and RS system embodiments may operate in other manners.

FIG. 1 is a block diagram illustrating an embodiment of a server computing system 100 that is suitable for performing at least some of the described techniques, such as by executing a Driver Behavior Analysis system and/or by executing a Route Selector system. The example server computing system 100 includes one or more central processing unit ("CPU") processors 135, various input/output ("I/O") components 105, storage 140, and memory 145. Illustrated I/O components in this example embodiment include a display 110, a network connection 115, a computer-readable media drive 120, and other I/O devices 130 (e.g., keyboards, mice or other pointing devices, microphones, speakers, etc.).

In the illustrated embodiment, a DBA system 160 and an RS system 170 are executing in memory 145, as is an optional traffic information provider system 150 and optional other systems provided by other programs 155 (e.g., a future traffic prediction program based at least in part on historical and current traffic data, a realtime traffic information provider system to provide traffic information to clients in a realtime or near-realtime manner, etc.), with these various executing systems generally referred to herein as traffic analysis systems. The server computing system 100 and its executing traffic analysis systems may communicate with other computing systems, such as various client devices 182, vehicle-based clients and/or data sources 184, road traffic sensors 186, other data sources 188, and third-party computing systems 190, via network 180 (e.g., the Internet, one or more cellular telephone networks, etc.) and optionally wireless communication link(s) 185. As discussed elsewhere, in at least some embodiments, only one of the DBA system 160 and RS system 170 may be executed on the server computing system 100, such as if the executed system interacts with corresponding information or systems elsewhere (e.g., on one or more third-party computing systems 190, such as under control of third-party entities) and/or if functionality of the DBA system 160 is used for purposes other than those of the RS system 170, and in other embodiments a single system executing on the server computing system 100 may include some or all of the functionality of both the DBA system 160 and RS system 170.

The client devices 182 may take various forms in various embodiments, and may generally include any communication devices and other computing devices capable of making requests to and/or receiving information from the traffic analysis systems. In some cases, the client devices 182 may include mobile devices that travel on particular roads (e.g., handheld cell phones or other mobile devices with GPS capabilities or other location determination capabilities that are carried by users traveling in vehicles, such as operators and/or passengers of the vehicles), and if so, such client devices may act as mobile data sources that provide current traffic data based on current travel on the roads (e.g., if the users of the client devices are on the roads). In addition, in some situations the client devices may run interactive console applications (e.g., Web browsers, smart phone apps, etc.) that users may utilize to make requests for generated traffic-related information (e.g., preferred routes from the RS system 170) and/or provide information for use by the DBA system 160 and/or RS system 170 (e.g., vehicle type information, driver preference information, etc.), while in other cases at least some such generated traffic-related information may be automatically sent to the client devices (e.g., as text messages, new Web pages, specialized program data updates, etc.) from one or more of the traffic analysis systems, including to provide realtime or near-realtime information about current traffic information (e.g., a realtime congestion map that includes current turn cost delays for particular traffic flow impediments based on actual information, current traffic measure assessments for particular compound links and/or alternative paths between particular decision point pairs, etc.).

The vehicle-based clients/data sources 184 in this example may each include a computing system located within a vehicle that provides data to one or more of the traffic analysis systems and/or that receives data from one or more of those systems. In some embodiments, the historical information used by the DBA system 160 may originate at least in part from a distributed network of vehicle-based data sources that provide information related to then-current traffic conditions. For example, each vehicle may include a GPS ("Global Positioning System") device (e.g., a cellular telephone with GPS capabilities, a stand-alone GPS device, etc.) and/or other geo-location device capable of determining the geographic location, speed, direction, and/or other data related to the vehicle's travel. One or more devices on the vehicle (whether the geo-location device(s) or a distinct communication device) may occasionally gather such data (e.g., a plurality of data samples that each indicate at least a then-current geographic location and associated time, optionally along with additional information) and provide it to one or more of the traffic analysis systems (e.g., by way of a wireless link). For example, a system provided by one of the other programs 162 may obtain and use current road traffic conditions information in various ways, and such information (whether as originally obtained or after being processed) may later be used by the DBA system 160 as historical data. Such vehicles may include a distributed network of individual users, fleets of vehicles (e.g., for delivery companies, transportation companies, governmental bodies or agencies, vehicles of a vehicle rental service, etc.), vehicles that belong to commercial networks providing related information (e.g., the OnStar service or other similar services), a group of vehicles operated in order to obtain such traffic conditions information (e.g., by traveling over predefined routes, or by traveling over roads as dynamically directed, such as to obtain information about roads of interest), etc. In addition, such vehicle-based information may be generated in other manners in other embodiments, such as by cellular telephone networks, other wireless networks (e.g., a network of Wi-Fi hotspots) and/or other external systems (e.g., detectors of vehicle transponders using RFID or other communication techniques, camera systems that can observe and identify license plates and/or users' faces) that can detect and track information about vehicles passing by each of multiple transmitters/receivers in the network.

The road traffic sensors 186 include multiple sensors that are installed in, at, or near various streets, highways, or other roadways, such as for one or more geographic areas. These sensors include loop sensors that are capable of measuring the number of vehicles passing above the sensor per unit time, vehicle speed, and/or other data related to traffic conditions. In addition, such sensors may include cameras, motion sensors, radar ranging devices, and other types of sensors that are located adjacent to a roadway. The road traffic sensors 186 may periodically or continuously provide measured data via wire-based or wireless-based data link to one or more of the traffic analysis systems via the network 180 using one or more data exchange mechanisms (e.g., push, pull, polling, request-response, peer-to-peer, etc.). For example, a system provided by one of the other programs 162 may obtain and use current road traffic conditions information in various ways, and that such information (whether as originally obtained or after being processed) may later be used as historical information by the DBA system 160 (e.g., as part of determining traffic conditions during which particular historical vehicle trips occurred). In addition, while not illustrated here, in some embodiments one or more aggregators of such road traffic sensor information (e.g., a governmental transportation body that operates the sensors, a private company that generates and/or aggregates data, etc.) may instead obtain the traffic data and make that data available to one or more of the traffic analysis systems (whether in raw form or after it is processed). In some embodiments, the traffic data may further be made available in bulk to the traffic analysis systems.

The other data sources 188 include a variety of types of other sources of data that may be utilized by one or more of the traffic analysis systems. Such data sources include, but are not limited to, holiday and season schedules or other information used to determine how to group and categorize historical data for specific days and times, schedule information for non-periodic events, schedule information related to traffic sessions, schedule information for planned road construction and other road work, road map data (e.g., to indicate locations of particular roads; connections between roads; particular road features that are traffic flow impediments; boundaries of particular traffic flow impediments, such as a start and end location for a traffic flow impediment when traveling in a particular direction on the road that includes that traffic flow impediment; etc.).

Third-party computing systems 190 include one or more optional computing systems that are operated by parties other than the operator(s) of the traffic analysis systems, such as parties who provide current and/or historical traffic data to the traffic analysis systems, and parties who receive and make use of traffic-related data provided by one or more of the traffic analysis systems. For example, the third-party computing systems may be map vendor systems that provide data (e.g., in bulk) to the traffic analysis systems. In some embodiments, data from third-party computing systems may be weighted differently than data from other sources. Such weighting may indicate, for example, how many measurements participated in each data point. Other third-party computing systems may receive generated traffic-related information from one or more of the traffic analysis systems and then provide related information (whether the received information or other information based on the received information) to users or others (e.g., via Web portals or subscription services). Alternatively, the third-party computing systems 190 may be operated by other types of parties, such as media organizations that gather and report such traffic-related information to their consumers, or online map companies that provide such traffic-related information to their users as part of travel-planning services.

In the illustrated embodiment of FIG. 1, the DBA system 160 includes a Decision Point Identifier module 162 and a Turn Cost Determiner module 164. The DBA system obtains historical traffic data and/or current traffic data from one or more of various sources, with such obtained traffic data stored in this example in a database 141 on storage 140 (e.g., optionally along with predicted future traffic data). As previously discussed, the historical data and/or current data may include data in a raw form as originally previously received from one or more external sources, or may instead be obtained and stored in a processed form. For example, for each of one or more traffic conditions measures of interest, historical data may include values for that measure for some or all road segments and/or road links for each of a variety of prior time periods. The historical and/or current traffic data may have been generated by one or more external sources, such as vehicle-based data sources 184, road traffic sensors 186, other data sources 188, and/or third-party computing systems 190, and in some embodiments may alternatively be remotely stored by one or more such sources and provided to the DBA system from such remote storage. In some embodiments, the DBA system 160 or other such system may further detect and/or correct various errors in the obtained traffic data (e.g., due to sensor outages and/or malfunctions, network outages, data provider outages, etc.), such as if the obtained data is raw data that was not previously processed. For example, data may be filtered and/or weighted in various ways to remove or deemphasize data from consideration if it is inaccurate or otherwise unrepresentative of traffic conditions of interest, including by identifying data samples that are not of interest based at least in part on roads with which the data samples are associated and/or data samples that are statistical outliers with respect to other data samples. In some embodiments, the filtering may further include associating the data samples with particular roads, road segments, and/or road links. The data filtering may further exclude data samples that otherwise reflect vehicle locations or activities that are not of interest (e.g., parked vehicles, vehicles circling in a parking lot or structure, etc.) and/or data samples that are otherwise unrepresentative of vehicle travel on roads of interest. In some embodiments, the DBA system 160 or other such system may also optionally aggregate obtained data from a variety of data sources, and may further perform one or more of a variety of activities to prepare data for use, such as to place the data in a uniform format; to discretize continuous data, such as to map real-valued numbers to enumerated possible values; to sub-sample discrete data; to group related data (e.g., a sequence of multiple traffic sensors located along a single segment of road that are aggregated in an indicated manner); etc.

After obtaining and optionally processing the historical and/or current traffic data, the Decision Point Identifier module 162 of the DBA system 160 then analyzes the obtained traffic data for use in identifying road decision points of interest based on actual driver behavior assessed from the obtained traffic data. As discussed in greater detail elsewhere, the module 162 may analyze the obtained traffic data to identify road decision points for a network of roads, select particular identified decision points for further use, track actual use by drivers of particular paths between particular pairs or other groupings of selected decision points, and select particular compound links based on the tracked actual use information. Such determined decision point information may be stored for later use in the decision points database 143 of storage 140 in this example, and/or may be directly provided by the DBA system 160 to the RS system 170 and/or to other systems (e.g., one of the other programs 155, at a third-party computing system 190, etc.) for further use. The module 162 may further use other types of data in at least some embodiments as part of its operations, such as road map data from database 142 on storage 140, or similar information from other sources.

In addition, the Turn Cost Determiner module 164 of the DBA system 160 may analyze the obtained traffic data for use in determining actual turn cost delays associated with particular traffic flow impediments, based on actual driver behavior assessed from the obtained traffic data. As discussed in greater detail elsewhere, the module 164 may analyze the obtained traffic data to determine actual delays for vehicles encountering various particular traffic flow impediments in the network of roads. Such determined actual delay information may be stored for later use in the traffic turn costs database 144 of storage 140, and/or may be directly provided by the DBA system 160 to the RS system 170 and/or to other systems (e.g., one of the other programs 155, at a third-party computing system 190, etc.) for further use. The module 164 may further use other types of data in at least some embodiments as part of its operations, such as road map data from database 142 on storage 140 or similar information from other sources, as well as information about particular traffic flow impediments from database 142 or other data sources.

After the DBA system 160 has generated decision point information and/or actual delay turn cost information, the RS system 170 and/or one or more other systems (e.g., one of the other programs 155, at a third-party computing system 190, etc.) may use that information in various ways, such as for the Route Determiner module 176 of the system 170 to determine particular recommended or preferred routes between locations in manners that are based at least in part on actual driver behavior information (e.g., based on identified decision points and associated path usage and/or based on actual determined delays for particular traffic flow impediments on route alternatives). The route-related information determined by the module 176 may in some embodiments be stored in a database (not shown) on storage 140, such as if the route-related information is determined in advance of its use with particular users and/or if the information is stored concurrently when it is dynamically determined for use by particular users. In addition, the RS system 170 may supply such determined route-related information to various external clients (e.g., to users of clients 182 and/or 184; to navigation systems and other systems that may interact with such users; to other traffic analysis systems, such as systems provided by other programs 155; to other external systems, such as systems executing on computing systems 190; etc.), such as under control of the Information Supplier module 178 of the system 170, including in situations in which the determined route-related information includes particular preferred routes between particular locations that are provided in response to requests from the clients.

It will be appreciated that the illustrated computing systems are merely illustrative and are not intended to limit the scope of the present invention. Computing system 100 may be connected to other devices that are not illustrated, including through one or more networks such as the Internet or via the Web. More generally, a "client" or "server" computing system or device, or traffic analysis system and/or module, may comprise any combination of hardware that can interact and perform the described types of functionality, optionally when programmed or otherwise configured with software, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system modules may in some embodiments be combined in fewer modules or distributed in additional modules. Similarly, in some embodiments the functionality of some of the illustrated modules may not be provided and/or other additional functionality may be available.

In addition, while various items are illustrated as being stored in memory or on storage while being used, these items or portions of them can be transferred between memory and other storage devices for purposes of memory management and/or data integrity. In at least some embodiments, the illustrated modules and/or systems are software modules/systems that include software instructions that, when executed by the CPU 135 or other processor, program that processor to automatically perform the described operations for that module/system. Alternatively, in other embodiments some or all of the software modules and/or systems may execute in memory on another device and communicate with the illustrated computing system/device via inter-computer communication. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 2:
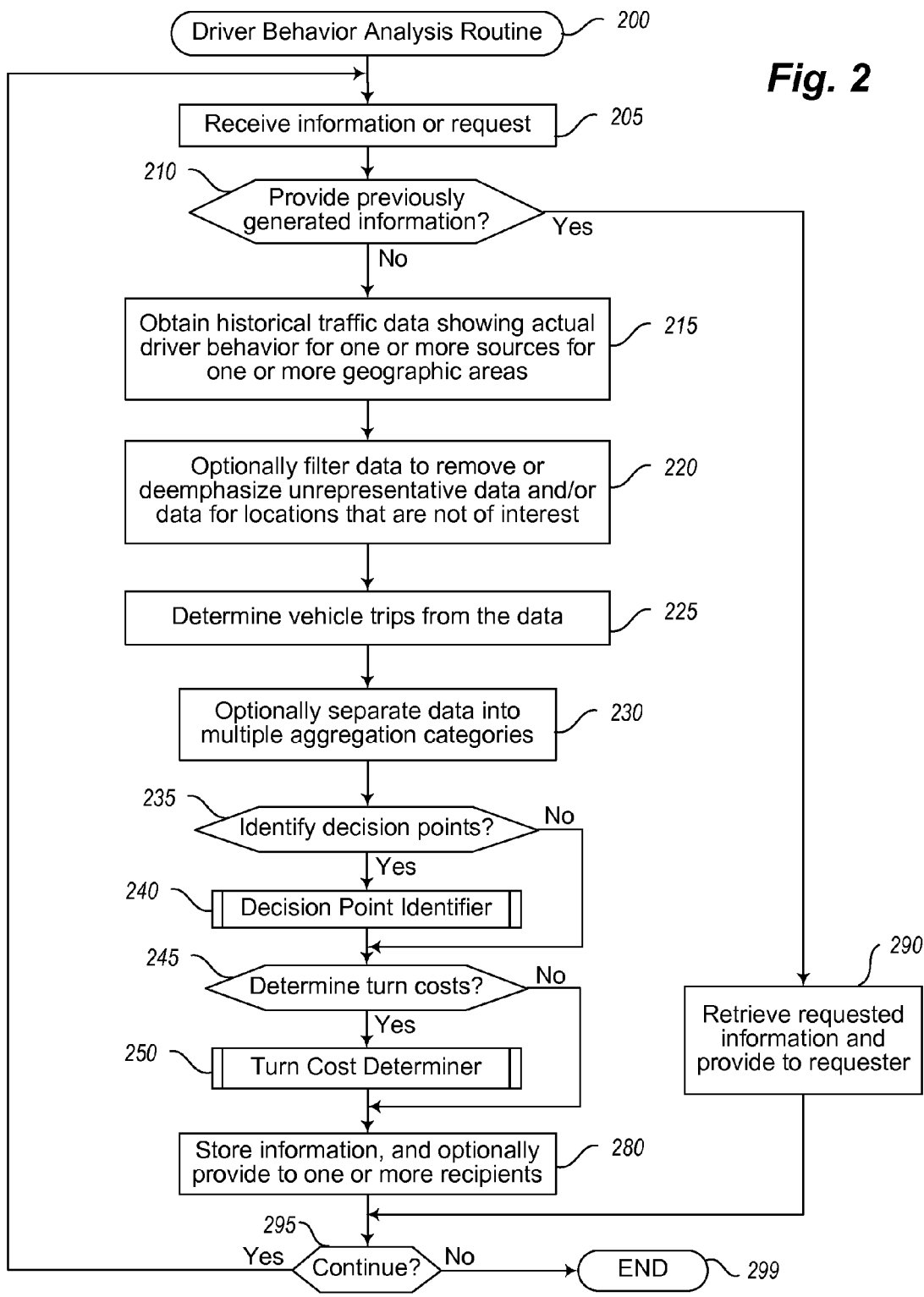
FIG. 2 is an example flow diagram of an illustrated embodiment of a Driver Behavior Analysis routine.

FIG. 2 is an example flow diagram of an illustrated embodiment of a

Driver Behavior Analysis routine 200. The routine may be provided by, for example, execution of an embodiment of the Driver Behavior Analysis system 160 of FIG. 1, such as to obtain and analyze information about actual driver behavior to automatically generate information about actual traffic-related patterns. Information that is automatically generated by the routine based on actual driver behavior may then be used in various manners in various embodiments, including in some situations by a Route Selector routine, with the routine 500 of FIG. 5 providing one example of such a routine. In the illustrated embodiment, the obtained traffic data that reflect actual driver behavior is historical data, although in other embodiments the obtained traffic data may include current traffic data, whether instead of or in addition to historical data.

The illustrated embodiment of the routine 200 begins at block 205, where information or a request is received. The routine continues to block 210 to determine if a request for previously generated information is received in block 205, and if not, continues to blocks 215-280 to automatically generate information about one or more types of actual traffic-related patterns. In this illustrated embodiment, in block 215, the routine obtains historical traffic data from one or more sources that reflects actual driver behavior on one or more roads in one or more geographic areas, such as by receiving some or all of the historical traffic data in block 205 and/or by retrieving data from storage or one or more other remote sources. As discussed in greater detail elsewhere, in at least some embodiments, some or all of the obtained historical traffic data includes numerous data samples from each of numerous vehicles traveling on the one or more roads, with each data sample from a vehicle including at least location data and associated time data, such as may be reported from a given vehicle periodically (e.g., every minute, every 5 seconds, every 100 feet, every mile, etc.). While not illustrated here, in some embodiments the routine may receive various pieces of traffic data in other manners, such as to receive one or more current data samples for a particular vehicle, and store the information for later analysis.

After block 215, the illustrated embodiment of the routine continues to block 220 to optionally filter the obtained data to remove or deemphasize (e.g., by using lower weighting) data that is unrepresentative of actual vehicle travel of interest and/or for locations that are not of interest, as discussed in greater detail elsewhere—in other embodiments, the obtained data may already have been filtered in such a manner, or instead no such filtering may be performed. After block 220, the routine continues to block 225 to determine particular vehicle trips from the obtained data, such as to gather and order the multiple data samples that are reported for each of multiple vehicles. In block 230, the routine then optionally separates some or all of the obtained data into one or more of multiple possible aggregation categories, such as categories that are each based on one or more times and/or one or more non-time conditions and/or one or more non-time factors, including in some situations to place each of some or all of the determined vehicle trips into one or more such aggregation categories.

After block 230, the routine continues to block 235 to determine whether to currently identify one or more decision points and determine associated compound links, such as based on the request or information received in block 205 or based on other configuration information for the routine 200. If so, the routine continues to block 240 to execute a Decision Point Identifier routine to perform such activities, with one example of such a routine being further described with respect to FIG. 3. After block 240, or if it is instead determined in block 235 not to currently identify one or more decision points and determine associated compound links, the routine continues to block 245.

In block 245, the routine determines whether to currently determine actual turn cost delays associated with particular traffic flow impediments, such as based on the request or information received in block 205 or based on other configuration information for the routine 200. If so, the routine continues to block 250 to execute a Turn Cost Determiner routine to perform such activities, with one example of such a routine being further described with respect to FIG. 4. After block 250, or if it is instead determined in block 245 not to currently determine actual turn cost delays associated with particular traffic flow impediments, the routine continues to block 280.

In block 280, the routine stores the information generated in some or all of blocks 215-250, and optionally provides the generated information to one or more recipients. If the routine instead determines in block 210 that a request for previously generated information is received in block 205, the routine continues to block 290 to provide requested information, such as information previously stored in block 280. The information stored in block 280 and/or provided in blocks 280 or 290 may include, for example, any identified decision points, any determined compound links, any determined travel measure assessments for particular compound links or other alternative paths between decision point pairs, any identified traffic flow impediments, any determined actual turn cost delays associated with particular traffic flow impediments, any associations of information with particular aggregation categories (including for vehicle trips and for any information generated in blocks 240 and/or 250 based on such vehicle trips), etc. The recipients, if any, may include a requester from whom a request was received in block 205, one or more particular designated clients for one or more particular types of generated information (e.g., an embodiment of a Route Selector routine, with one example of such a routine being illustrated with respect to FIG. 5), etc. For example, in at least some embodiments, such other designated clients or recipients may include a system that uses determined turn cost delays to determine signal timing for a group of related traffic signals, or may include multiple end-users (e.g., drivers) to whom determined information is provided (e.g., determined compound links and related travel measure assessments and/or determined actual turn costs delays for use by a navigation system used by those end-users). In other embodiments in which routine 200 or a related routine analyzes current traffic conditions, a system used by an end-user (e.g., as part of an in-vehicle system, a smart phone app on a mobile device of the driver or a vehicle passenger, etc.) or information provided to an end-user may include information about current conditions, such that a corresponding aggregation category may be selected, and automatically generated traffic information based on prior actual driver behavior for that aggregation category may be used for the end-user, optionally in conjunction with any factors specific to that end-user (e.g., vehicle type, driver preference, etc.). In addition, in some embodiments, such a system used by an end-user may further provide related information to the routine 200 that is used as part of the analysis (e.g., as part of the selection of an appropriate aggregation category for a determined vehicle trip), such as one or more vehicle types and/or driver preferences for a particular vehicle who supplies data samples.

After blocks 280 or 290, the routine continues to block 295 to determine whether to continue, such as unless an explicit indication to terminate is received. If it is determined to continue, the routine returns to block 205, and otherwise continues to block 299 and ends.

Figure 3:
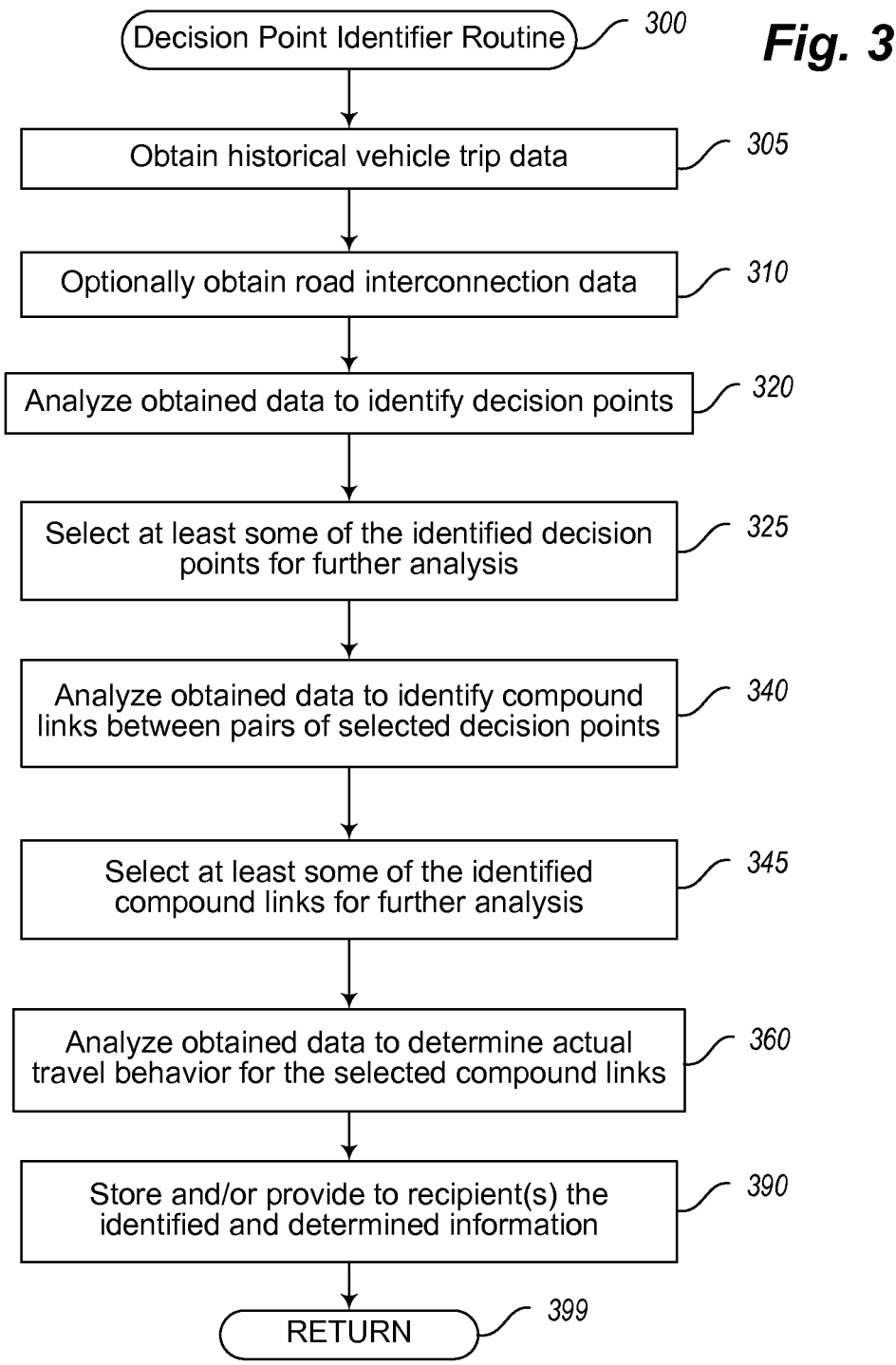
FIG. 3 is an example flow diagram of an illustrated embodiment of a Decision Point Identifier routine.

FIG. 3 is an example flow diagram of an illustrated embodiment of a Decision Point Identifier routine 300. The routine may be provided by, for example, execution of an embodiment of the Decision Point Identifier module 162 of FIG. 1, such as to obtain and analyze information about actual driver behavior to automatically identify decision points, determine compound links between decision point pairs, and determine one or more traffic-related measure assessments for the determined compound links. In addition, the routine 300 may be invoked in various manners, including with respect to block 240 of the illustrated embodiment of the routine 200 of FIG. 2.

The routine 300 begins at block 305, where various historical vehicle trip data is obtained, such as vehicle trip data previously determined in block 225 of FIG. 2 and optionally associated with one or more aggregation categories in block 230 of FIG. 2. As discussed with respect to FIG. 2, the historical data may have various forms (e.g., including series or sequences of individual data samples for a particular vehicle) and be obtained in various manners in various embodiments, and in some embodiments may include current traffic data, whether instead of or in addition to the historical data. In the illustrated embodiment, the routine then continues to block 310 to optionally obtain road interconnection data, such as from storage or by retrieving the data from one or more map data sources—such road interconnection data may indicate locations at which two or more roads join, split or cross, thus indicating at least some of the possible decision points for a geographic area of interest.

In block 320, the routine then analyzes the obtained data to identify decision points to consider in which two or more roads diverge and/or converge, with at least some such decision points providing drivers with two or more choices corresponding to possible alternative paths and in some situations one or more such decision points not providing a choice to drivers (e.g., when two roads merge into one). The identification of such decision points may be performed in various manners in various embodiments, such as based on road interconnection data and/or by identifying locations at which vehicle trips diverge and/or converge. As previously noted, in some embodiments, a divergence and/or convergence of vehicle trips may be treated as an identified decision point only if one or more specified criteria are satisfied, such as based on a total volume of vehicle trips passing the possible decision point, on the vehicle trips diverging or converging at the possible decision point at a rate or amount greater than a specified threshold rate (e.g., to eliminate possible decision points at which more than a maximum threshold all select a single alternative), etc. In block 325, at least some of the identified decision points are selected for further analysis in one or more manners. For example, as previously discussed, a subset of the identified decision points may be selected for further analysis based on one or more of frequency or volume of total traffic through the decision point (e.g., to rank decision points based on traffic volume, and to select a particular quantity or percentage of decision points with the highest rankings), of the relative vehicle traffic that chooses the various alternatives at the decision point (e.g., to rank decision points based on viability of at least two alternatives that are frequently used, and to select a particular quantity or percentage of decision points with the highest rankings), etc. In some embodiments, the top N such decision points are selected for further use (with N being variable in different embodiments, such as to be configurable by an operator of the routine or a requester who initiated execution of the routine, such as previously described with respect to block 205 of FIG. 2). In addition, in some embodiments, a subset of identified decision points may be determined in other manners, such as to select one or more identified decision points for each of some or all road types and/or roads, including in some such embodiments to use different values of N for different types of roads (e.g., to have a higher N value for roads with higher traffic volumes) and/or roads.

After block 325, the routine continues to block 340 to analyze the obtained data to identify one or more compound links between each of one or more pairs of selected decision points, and in block 345 selects at least some of the identified compound links for further use, such as to determine preferred compound links between pairs of decision points based on actual driver behavior given particular times, conditions and/or factors. As previously noted, one or more compound links between a pair of decision points may be identified in various manners in various embodiments. For example, identification of compound links may include identifying the vehicle trips that occur between some or all pairs of selected decision points, and selecting particular pairs of decision points to represent the starting and ending points of such compound links based on, for example, volume of total traffic between a particular pair of decision points, such as to rank such decision point pairs based on traffic volume, and to select a particular quantity or percentage of decision point pairs with the highest rankings to further consider. In some embodiments, the top M decision point pairs are selected for further use (with M being variable in different embodiments, such as to be configurable by an operator of the routine or a requester who initiated execution of the routine, such as previously described with respect to block 205 of FIG. 2). In addition, in some embodiments, at least some such decision point pairs may be discarded from further consideration if one or more specified criteria are met or not met (e.g., if the number of single vehicle trips for the decision point pair is below a minimum amount, if some or all of multiple alternative paths between a decision point pair do not satisfy one or more specified criteria based on frequency of use or total amount of use or speed variability, etc.). When a selected decision point pair is separated by multiple alternative paths, but a single one of those alternative paths is sufficiently preferred based on actual driver behavior (e.g., used by at least a minimum percentage or other minimum amount of prior vehicle trips between the decision points of the selected pair, at least under a combination of one or times, conditions and/or factors), that single alternative path may be selected as a compound link for at least that combination of one or times, conditions and/or factors. Two or more of the multiple alternative paths for a selected decision point pair may further each be selected as a compound link in at least some embodiments and situations, such as for different aggregation categories with different combinations of one or times, conditions and/or factors.

After block 345, the routine continues to block 360 to perform further analysis of the obtained data to determine assessments of one or more traffic measures for the selected compound links. As discussed in greater detail previously, such traffic measures may include, for example, average or other representative travel times, average or other representative traffic volumes, average or other representative variability in travel time or traffic volume or other measure, etc., and the assessment of a particular traffic measure for a particular compound link (and optionally aggregation category) may include one or more assessed values. Thus, in some situations, different compound links for a given decision point pair may have different assessed values for a given traffic measure (and optionally aggregation category), and/or a single compound link for a given decision point pair may have different assessed values for a given traffic measure for different aggregation categories.

After block 360, the routine continues to block 390 to store and/or provide to one or more recipients the identified and determined information, such as the identified, decision points, the selected identified compound links and the associated determined travel measure assessments, and to then return in block 399. For example, in the illustrated embodiment, the information may be provided to the routine 200 as output of the block 240, although in other embodiments the information may be provided to one or more other recipients, whether instead of or in addition to the routine 200.

Figure 4:
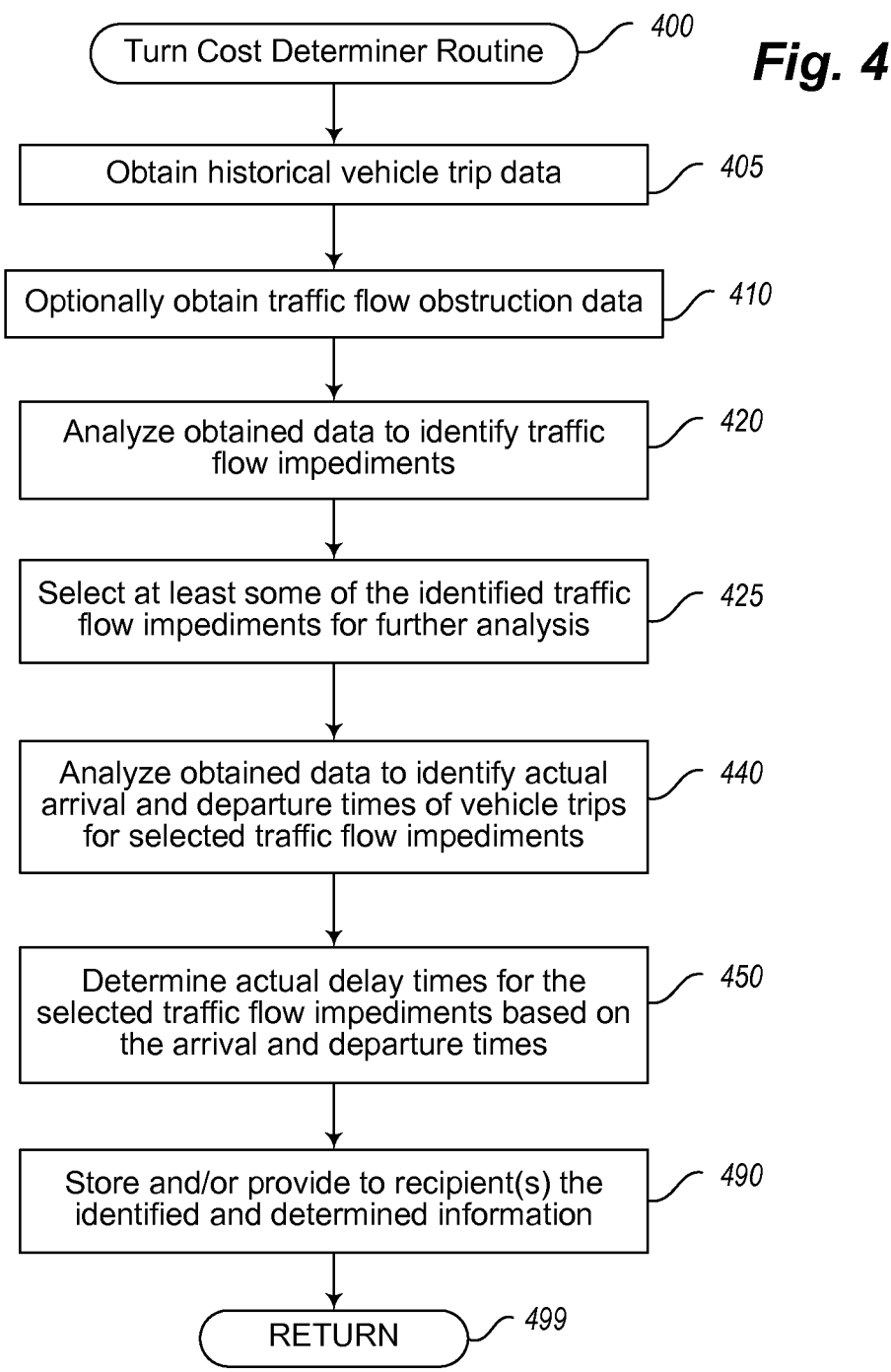
FIG. 4 is an example flow diagram of an illustrated embodiment of a Turn Cost Determiner routine.

FIG. 4 is an example flow diagram of an illustrated embodiment of a Turn Cost Determiner routine 400. The routine may be provided by, for example, execution of an embodiment of the Turn Cost Determiner module 164 of FIG. 1, such as to obtain and analyze information about actual driver behavior in order to automatically determine actual turn cost delays associated with particular traffic flow impediments of interest. In addition, the routine 400 may be invoked in various manners, including with respect to block 250 of the illustrated embodiment of the routine 200 of FIG. 2.

The routine 400 begins at block 405, where various historical vehicle trip data is obtained, such as vehicle trip data previously determined in block 225 of FIG. 2 and optionally associated with one or more aggregation categories in block 230 of FIG. 2. As discussed with respect to FIG. 2, the historical data may have various forms (e.g., including series or sequences of individual data samples for a particular vehicle) and be obtained in various manners in various embodiments, and in some embodiments may include current traffic data, whether instead of or in addition to the historical data. In the illustrated embodiment, the routine then continues to block 410 to optionally obtain data about traffic flow obstructions, such as from storage or by retrieving the data from one or more map data sources—such traffic flow obstruction data may, for example, indicate particular types of road features and/or particular previously identified decision points.

In block 420, the routine then analyzes the obtained data to identify traffic flow impediments to consider at which drivers may face travel delays during at least some combinations of one or more times, conditions and/or factors. As previously noted, in some embodiments, a particular identified decision point or other road feature may be considered to be a traffic flow impediment only if one or more specified criteria are satisfied, such as based on a total volume of vehicle trips passing the possible traffic flow impediment, on a percentage or other amount of delay faced by vehicles passing the traffic flow impediment, on a percentage or other quantity of vehicles that face a delay when passing the traffic flow impediment, etc. In block 425, at least some of the identified traffic flow impediments are selected for further analysis in one or more manners. For example, as previously discussed, a subset of the identified traffic flow impediments may be selected for further analysis based on one or more of frequency or volume of total traffic through the traffic flow impediment (e.g., to rank traffic flow impediments based on traffic volume, and to select a particular quantity or percentage of decision points with the highest rankings), of amount of traffic delay associated with the traffic flow impediment, etc. In some embodiments, the top L such traffic flow impediments are selected for further use (with L being variable in different embodiments, such as to be configurable by an operator of the routine or a requester who initiated execution of the routine, such as previously described with respect to block 205 of FIG. 2).

After block 425, the routine continues to block 440 to analyze the obtained data to identify actual arrival and departure times of particular vehicles whose vehicle trips pass the traffic flow impediment, and in block 450 determines actual delay times associated with particular traffic flow impediments, such as to average or otherwise aggregate the actual delay times for the individual vehicle trips (as determined using the identified actual arrival and departure times of the vehicles for those vehicle trips) associated with a particular traffic flow impediment. As described in greater detail elsewhere, the vehicle trips and associated actual delay times may be separated into multiple aggregation categories that each have a distinct combination of one or more times, conditions and/or factors, such that a particular traffic flow impediment may have multiple associated actual delay times that each correspond to a distinct aggregation category.

After block 450, the routine continues to block 490 to store and/or provide to one or more recipients the identified and determined information, such as the selected identified traffic flow impediments and the associated determined actual travel turn cost delays, and to then return in block 499. For example, in the illustrated embodiment, the information may be provided to the routine 200 as output of the block 250, although in other embodiments the information may be provided to one or more other recipients, whether instead of or in addition to the routine 200.

Figure 5:
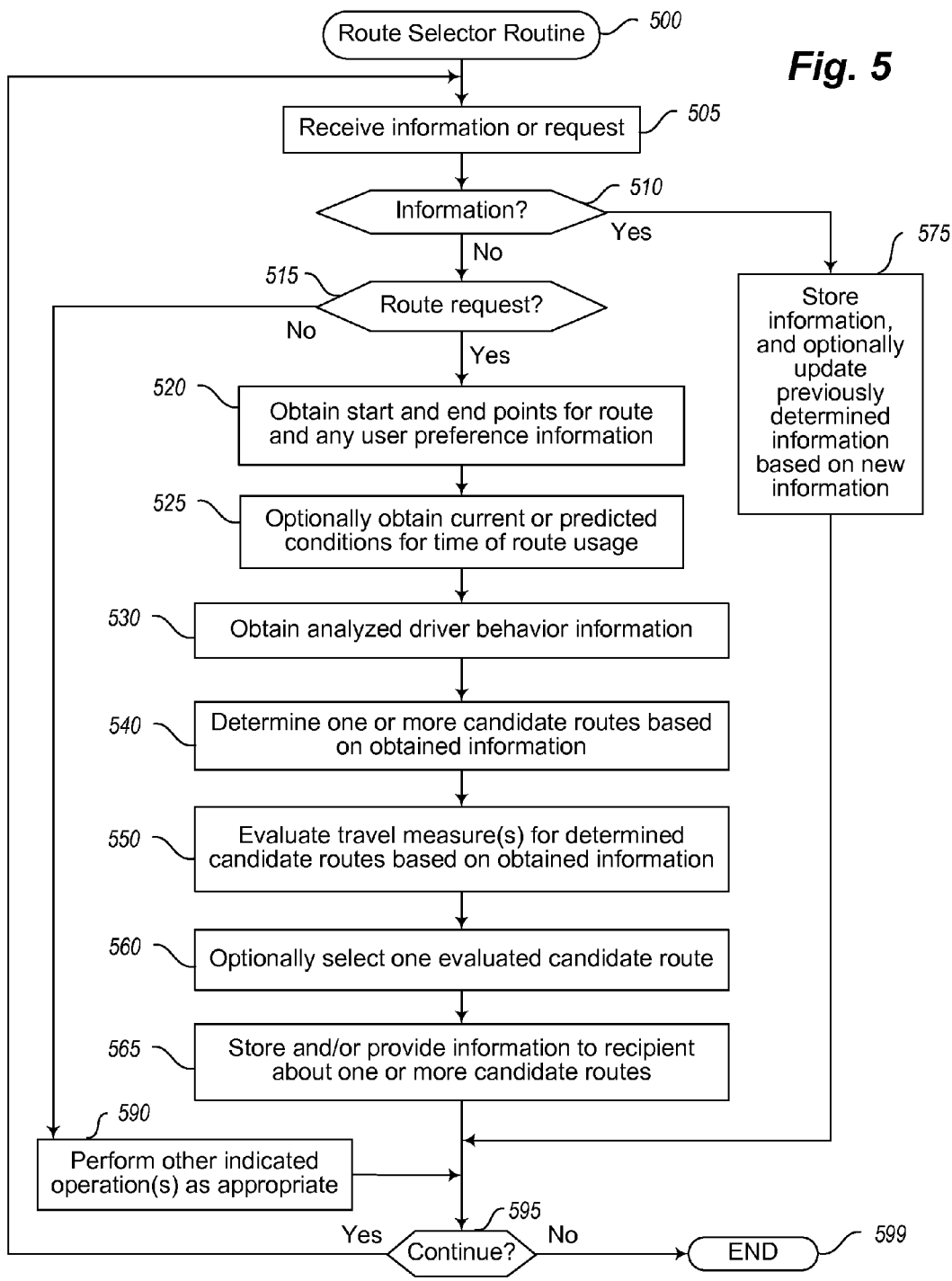
FIG. 5 is an example flow diagram of an illustrated embodiment of a Route Selector routine.

FIG. 5 is an example flow diagram of an illustrated embodiment of a Route Selector routine 500. The routine may be provided by, for example, execution of an embodiment of the Route Selector system 170 of FIG. 1, such as to determine routes through a network of roads based at least in part on information about road traffic for those roads that reflects actual behavior of drivers of vehicles on that road network. The routine may use information that is automatically identified, determined or otherwise generated based on actual driver behavior in various manners in various embodiments, including in some situations to use information from a Driver Behavior Analysis routine, with the routine 200 of FIG. 2 providing one example of such a routine.

The illustrated embodiment of the routine 500 begins at block 505, where information or a request is received. The routine continues to block 510 to determine if information is received in block 505 for later use (e.g., information about a particular user, such as vehicle type information, driver preference information, etc.; traffic information generated from analyzing actual historical driver behavior, such as information generated by one or both of routines 300 and 400 of FIGS. 3 and 4, respectively, and provided by routine 200 of FIG. 5, such as in response to a previous request or instead that is pushed to routine 500 by routine 200). If so, the routine continues to block 575 to store the information for later use. In some embodiments, if information was previously generated to which the current information corresponds, the previously generated information may be updated to reflect the currently stored information—for example, if one or more preferred routes have been previously generated along roads to which the current information corresponds and stored for later use, that preferred route information may be reevaluated in light of the current information.

If it is instead determined in block 510 that information was not received in block 505 for later user, the routine continues instead to block 515 to determine if a request to dynamically generate a particular route is received in block 505. If so, the routine continues to blocks 520-565 to automatically generate information about one or more candidate routes between locations of interest. In particular, in this illustrated embodiment, the routine obtains in block 520 information about start and end points for the route and any associated user preference information, such as by receiving the information with the request in block 505 and/or by retrieving stored information associated with a specific user indicated for the request (e.g., information previously stored in block 575)—such user preference information may include, for example, a vehicle type and/or driver preferences, one or more times at which the route will be used, other condition information corresponding to route usage, etc. In block 525, the routine then optionally obtains current or predicted conditions for a current time (or other time of route usage if optionally indicated), such as for use in determining one or more particular aggregation categories to use when selecting associated traffic information generated for actual historical driver behavior—such information may, for example, be included with the request in block 505 and/or retrieved from one or more sources of traffic information. In block 530, the routine then obtains traffic information generated from analyzing actual historical driver behavior, such as information generated by one or both of routines 300 and 400 of FIGS. 3 and 4, respectively, and provided by routine 200 of FIG. 5—such information may, for example, have been previously received by the routine 500 and stored in block 575, or instead dynamically retrieved with a corresponding request to the routine 200.

After block 530, the routine continues to block 540 to determine one or more candidate routes in response to the received request and by using the obtained information, including the obtained traffic information generated from analyzing actual historical driver behavior, and in block 550 evaluates the candidate routes, such as by assessing one or more traffic measures for each of the candidate routes—as discussed in greater detail elsewhere, the generation and evaluation of the candidate routes may include, for example, using determined compound links and associated traffic measure assessments and/or using determined actual turn cost delays for traffic flow impediments, such as for one or more aggregation categories corresponding to the received request. In block 560, the routine then optionally selects one of the evaluated candidate routes, such as if information about only one of the candidate routes is returned for the request, or if a preferred one of multiple candidate routes is indicated as part of the response. In block 565, such information about one or more of the candidate routes is then provided to the requester from whom the request was received and/or stored, such as to indicate one or more of the candidate routes, optionally along with an indication of preference(s) among those indicated routes and/or to provide the traffic measure assessments of those indicated routes. As discussed in greater detail elsewhere, the information may be provided to an end-user in various manners, such as via an intermediate navigation system or other system.

If it is instead determined in block 515 that a request to dynamically generate a route is not received in block 505, the routine instead continues to block 590 to perform one or more other indicated operations as appropriate. Such other operations may include, for example, providing information that was previously generated and stored for later use, such as a preferred route between commonly used locations.

After blocks 565, 575 or 590, the routine continues to block 595 to determine whether to continue, such as until an explicit indication to terminate is received. If it is determined to continue, the routine returns to block 505, and otherwise continues to block 599 and ends.

While the illustrated embodiments of the routines 200-500 of FIGS. 2-5 correspond to analyzing road traffic information in a network of roads based on prior actual driver behavior, and to using such analyzed road traffic information to generate and evaluate routes among a network of roads, similar techniques may be applied to other environments in other embodiments. For example, a geographic area that includes a controlled border may have multiple alternative border crossings that have different wait times or other differing travel-related characteristics at different times and/or under other differing conditions—accordingly, the travel of vehicles across the border may be tracked in manners similar to those previously discussed, actual delay times associated with the different border crossings may be determined for one or more different times or conditions, and such actual delay times may be used in various manners, such as to be provided to users upon request, used to publish comparative information for different border crossings, used for cross-border routes, etc. In addition, as user-carried mobile devices that include GPS or other location-determination technologies become increasingly common, travel and movement information for users with such devices may be used even in situations in which the users are not in cars or other motorized vehicles. Thus, as one example, user movement information may be tracked for humans as they move on foot among varying paths, including when there are multiple alternative transit paths between particular starting and ending locations, and corresponding foot travel information may be automatically generated based on prior actual foot-traveler behavior. For example, many airports may have multiple alternative security checkpoints through which travelers may pass, but which may have consistent different travel patterns during at least some times—if so, actual delay times associated with the different security checkpoints may be determined and used in various manners for one or more different times, such as to be provided to users upon request or used to publish comparative information for different security checkpoints. In a similar manner, many stadiums and other venues may have multiple entrances that similarly may have consistent different wait patterns at different times or in other conditions, and corresponding actual delay times may be determined and used in various manners. In addition, different wait times associated with related alternatives of various types (e.g., restaurants in a nearby area) may be tracked, and associated actual delay times at different times and/or under different conditions may similarly be determined and used to assist users in selecting between particular alternatives at different times. Moreover, when multiple alternative paths exist between two locations that are not based on roads accessible to motorized vehicles, travel of people walking or riding bicycles or traveling in other manners (e.g., in wheelchairs, on Segway transports or similar equipment, on horseback, etc.) may be tracked in order to determine preferred routes that correspond to compound links between particular decision points along those paths, and travel measures may be assessed for such compound links.

In addition, various embodiments provide various mechanisms for users and other clients to interact with the DBA system, the RS system, and/or or one or more of the modules of such systems (e.g., the Decision Point Identifier module 162 and/or the Turn Cost Determiner module 164 of FIG. 1). For example, some embodiments may provide an interactive console (e.g. a client program providing an interactive user interface, a Web browser-based interface, etc.) from which clients can make requests and receive corresponding responses, such as requests for information related to current and/or predicted traffic conditions, related to particular information that is identified or determined by the modules, and/or requests to analyze, select, and/or provide information related to travel routes. Some embodiments may provide an API ("Application Programming Interface") that allows client computing systems to programmatically make some or all such requests, such as via network message protocols (e.g., Web services) and/or other communication mechanisms.

Additional details related to filtering, conditioning, and aggregating information about road conditions are available in pending U.S. patent application Ser. No. 11/473,861 (filed Jun. 22, 2006 and entitled "Obtaining Road Traffic Condition Data From Mobile Data Sources;" in pending U.S. application Ser. No. 11/367,463, filed Mar. 3, 2006 and entitled "Dynamic Time Series Prediction of Future Traffic Conditions;" and in pending U.S. application Ser. No. 11/835,357, filed Aug. 7, 2007 and entitled "Representative Road Traffic Flow Information Based On Historical Data;" each of which is hereby incorporated by reference in its entirety.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interlace screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein, such as for the appended claims. In addition, while certain aspects of the invention may be presented in certain claim forms, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
   receiving information about a plurality of prior vehicle trips along a plurality of roads in a geographic area, the plurality of prior vehicle trips involving a plurality of drivers of vehicles and each reflecting actual prior behavior of one of the plurality of drivers in traveling between a starting location in the geographic area and an ending location in the geographic area, the received information including, for each of the prior vehicle trips, indications of multiple data samples reported by a device in the vehicle as the vehicle travels between the starting and ending locations for that vehicle trip, wherein the device in the vehicle has GPS ("geographical positioning system") capabilities and is at least one of a mobile device of a user who is in the vehicle or a part of a navigation system for the vehicle, and wherein each of the data samples indicates a road location and an associated time when the vehicle is at the indicated road location;
   identifying multiple traffic flow impediments that each is a structural part of one of the plurality of roads and restricts traffic flow on that one road during at least some times to speeds below a posted maximum speed for that one road;
   automatically analyzing the received information about the plurality of prior vehicle trips to determine actual time delays for the traffic flow impediments based on actual prior behavior of the plurality of drivers, the automatically analyzing being performed by at least one of one or more programmed computing systems and including, for each of the traffic flow impediments:
      determining an expected amount of traversal time of the traffic flow impediment by a vehicle based on an average speed of traffic for the road of which the traffic flow impediment is a structural part;
      identifying multiple of the plurality of prior vehicle trips that travel past the traffic flow impediment;
      for each of the identified multiple prior vehicle trips, determining an amount of actual delay for the traffic flow impediment during the prior vehicle trip by calculating a numerical difference between an actual amount of traversal time of the traffic flow impediment during the prior vehicle trip and the expected traversal time amount for the traffic flow impediment, the actual amount of the traversal time of the traffic flow impediment during the prior vehicle trip being based in part on a first time at which a first road location of one of the multiple data samples for that prior vehicle trip is before the traffic flow impediment and on a later second time at which a second road location of another of the multiple data samples for that prior vehicle trip is past the traffic flow impediment; and
      averaging the determined actual delay amounts for the identified multiple prior vehicle trips in order to generate the determined actual time delay for the traffic flow impediment; and
   after the determining of the actual time delays for the traffic flow impediments, automatically using the determined actual time delays to improve routing of additional vehicle trips through the geographic area, the using of the determined actual time delays being performed by at least one of the one or more programmed computing systems and including, for each of multiple requests for a route between two indicated locations in the geographic area:
      identifying multiple alternative paths between the two indicated locations for the request, the identified multiple alternative paths including one or more of the traffic flow impediments;
      evaluating each of the identified multiple alternative paths based at least in part on the determined actual time delays for the one or more traffic flow impediments, and selecting a preferred one of the identified multiple alternative paths based on the evaluating; and
   providing the selected one alternative path as the route for the request, the one alternative path being selected based at least in part on the determined actual time delays for the one or more traffic flow impediments.

2. The method of claim 1 wherein the identified multiple traffic flow impediments each includes at least one of a traffic signal light, a traffic stop sign, or an intersection of two or more roads.

3. The method of claim 1 wherein the determining of the actual time delays for the traffic flow impediments further includes, for each of one or more of the traffic flow impediments:
determining multiple different time periods of interest; and
for each of the multiple different time periods, selecting a subset of the identified multiple prior vehicle trips traveling past the traffic flow impediment that correspond to the time period of interest, and generating a determined actual time delay for the traffic flow impediment for the time period by using the determined amount of actual delay for the traffic flow implement for the selected subset of identified multiple prior vehicle trips, and wherein the generated determined actual time delays for the traffic flow impediment for the multiple different time periods have multiple differing values.

4. The method of claim 1 wherein the receiving of the information about the plurality of prior vehicle trips along the plurality of roads includes receiving a plurality of data samples that are generated by a plurality of vehicles, the received plurality of data samples including the multiple data samples for each of the plurality of prior vehicle trips, and includes analyzing the received plurality of data samples to identify at least the plurality of prior vehicle trips for use in the determining of the actual time delays for the traffic flow impediments.

5. The method of claim 1 wherein the at least one programmed computing systems that perform the automatic analyzing of the received information about the plurality of prior vehicle trips to determine actual time delays for the traffic flow impediments are part of an automated driver behavior analysis system, and wherein the at least one programmed computing systems that perform the automatic using of the determined actual time delays to improve routing of additional vehicle trips through the geographic area are part of an automated route selection system.

6. A computer-implemented method comprising:
receiving, by one or more programmed computing systems of an automated driver behavior analysis system, information about a plurality of prior vehicle trips along a plurality of roads in a geographic area by a plurality of drivers of vehicles and each reflecting actual prior behavior of one of the plurality of drivers in traveling between locations in the geographic area, wherein the received information includes, for each of the prior vehicle trips, indications of multiple road locations of the vehicle for that vehicle trip and of an associated time for each of the indicated road locations, and wherein the indications of the multiple road locations of the vehicle for the vehicle trip are generated by a device in the vehicle that has location determination capabilities and that is at least one of a mobile device of a user who is in the vehicle or a part of a navigation system for the vehicle;
identifying, by the one or more programmed computing systems, multiple traffic flow impediments that each is a structural feature of one of the plurality of roads and restricts traffic flow on that one road during at least some times to speeds below an average speed for that one road;
automatically analyzing, by the one or more programmed computing systems, the received information about the plurality of prior vehicle trips to determine actual time delays associated with each of the identified traffic flow impediments based on actual prior behavior of the plurality of drivers, the automatically analyzing including, for each of the identified traffic flow impediments, determining the actual time delay for the identified traffic flow impediment based on a numerical difference between an average actual amount of traversal time associated with the identified traffic flow impediment from multiple prior vehicle trips and an expected amount of traversal time associated with the identified traffic flow impediment; and
automatically performing routing decisions for subsequent vehicle travel by using information about the determined actual time delays.

7. The method of claim 6 wherein the using of the information about the determined actual time delays includes evaluating each of multiple alternative paths for a route in the geographic area to reflect an expected travel time for the alternative path, at least one of the multiple alternative paths including at least one of the identified traffic flow impediments and having an expected travel time that is based in part on the determined actual time delays for the at least one identified traffic flow impediments.

8. The method of claim 6 wherein the using of the information about the determined actual time delays is performed by the one or more programmed computing systems and includes sending the information about the determined actual time delays for the identified traffic flow impediments to one or more other programmed computing systems that are part of an automated route selection system distinct from the driver behavior analysis system.

9. The method of claim 6 wherein at least some of the identified multiple traffic flow impediments each includes at least one of a traffic signal light or a traffic stop sign.

10. The method of claim 6 wherein at least some of the identified multiple traffic flow impediments each includes an intersection of two or more roads.

11. The method of claim 6 wherein at least some of the identified multiple traffic flow impediments each includes at least one of a metered location, a toll location, or an abrupt vehicle maneuver location.

12. The method of claim 6 further comprising, for each of one or more of the identified traffic flow impediments, automatically determining the expected amount of traversal time associated with the identified traffic flow impediment based at least in part on an average speed for the road of which that identified traffic flow impediment is a structural feature.

13. The method of claim 6 further comprising, for each of one or more of the identified traffic flow impediments, automatically determining the expected amount of traversal time associated with the identified traffic flow impediment based at least in part on one or more speeds from travel of one or more vehicles for one or more prior vehicle trips before reaching the identified traffic flow impediment and after leaving the identified traffic flow impediment.

14. The method of claim 6 wherein the determining of the actual time delay for one of the identified traffic flow impediments includes, for each of at least some of the multiple prior vehicle trips, determining a first time at which a first road location of the vehicle for the prior vehicle trip is before the one identified traffic flow impediment, determining a later second time at which a second road location of the vehicle for that prior vehicle trip is after the one identified traffic flow impediment, and determining an amount of traversal time between the determined first and second times.

15. The method of claim 14 wherein, for each of the at least some prior vehicle trips, a length of the one identified traffic flow impediment that is used to determine the expected traversal time amount associated with the identified traffic flow impediment for that prior vehicle trip is a distance between the first and second road locations of the vehicle during that prior vehicle trip.

16. The method of claim 15 wherein, for each of the at least some prior vehicle trips, the one identified traffic flow impediment is represented as a point location.

17. The method of claim 14 wherein, for each of the at least some prior vehicle trips, the first road location of the vehicle for the prior vehicle trip is a first distance before a first boundary location associated with the one identified traffic flow impediment, the second road location of the vehicle for the prior vehicle trip is a second distance after a second boundary location associated with the one identified traffic flow impediment, the determining of the amount of traversal time between the determined first and second times is reduced to reflect the first and second distances, and a length of the one identified traffic flow impediment used to determine the expected traversal time amount associated with the one identified traffic flow impediment is a distance between the first and second boundary locations.

18. The method of claim 17 wherein reducing of the amount of traversal time between the determined first and second times to reflect the first and second distances includes using a selected speed that is an average speed for the road of which the one identified traffic flow impediment is a structural feature.

19. The method of claim 17 wherein reducing of the amount of traversal time between the determined first and second times to reflect the first and second distances for one of the at least some prior vehicle trips includes using one or more speeds from travel of the vehicle for the one prior vehicle trip before the first road location for that one prior vehicle trip and from travel of the vehicle for the one prior vehicle trip after the second road location for that one prior vehicle trip.

20. The method of claim 6 further comprising, for each of one or more of the identified traffic flow impediments, automatically selecting each of multiple prior vehicle trips that travel past the identified traffic flow impediment to use for the determining of the actual time delay for the identified traffic flow impediment, and excluding from the selected multiple prior vehicle trips each of one or more other prior vehicle trips that travel past the identified traffic flow impediment based at least in part on the indicated multiple road locations of the excluded prior vehicle trip not including one or more road locations within a specified minimum distance of the location of the identified traffic flow impediment.

21. The method of claim 6 wherein the determining of the actual time delay associated with each of at least some of the identified traffic flow impediments is further performed for each of one or more distinct aggregation categories that each includes at least one of one or more time periods and of one or more non-time factors, by selecting a subset of the multiple prior vehicle trips traveling past the identified traffic flow impediment that correspond to the aggregation category, and by generating a determined actual time delay for the identified traffic flow impediment for the aggregation category based on the determined amount of traversal time delays for the identified traffic flow implement for the selected subset of prior vehicle trips.

22. The method of claim 21 wherein the one or more distinct aggregation categories include multiple aggregation categories that each includes a distinct period of time, and wherein the generated determined actual time delays for the identified traffic flow impediment for the multiple distinct aggregation categories include multiple distinct values.

23. The method of claim 21 wherein the one or more distinct aggregation categories include multiple aggregation categories that each includes one of multiple vehicle types, and wherein the generated determined actual time delays for the identified traffic flow impediment for the multiple distinct aggregation categories include multiple distinct values.

24. The method of claim 21 wherein the one or more distinct aggregation categories include multiple aggregation categories that each includes one of multiple driver preferences, and wherein the generated determined actual time delays for the identified traffic flow impediment for the multiple distinct aggregation categories include multiple distinct values.

25. The method of claim 6 wherein the received information about the plurality of prior vehicle trips includes a plurality of data samples that each reports an indicated associated road location of one of the plurality of vehicles at an indicated time, wherein the device in the vehicle for each of the prior vehicle trips has wireless transmission capabilities that are used to send to the one or more programmed computing systems a subset of the plurality of data samples for the vehicle, and wherein the method further comprises analyzing the plurality of data samples to identify the plurality of prior vehicle trips.

26. The method of claim 6 wherein the identifying of the multiple traffic flow impediments that each is a structural feature of one of the plurality of roads is performed based at least in part on map data obtained from an external source.

27. The method of claim 6 wherein the identifying of the multiple traffic flow impediments that each is a structural feature of one of the plurality of roads includes analyzing, by the one or more programmed computing systems, the received information about the plurality of prior vehicle trips to identify boundaries of at least some of the identified multiple traffic flow impediments based on restrictions of traffic flows during at least some times.

28. A non-transitory computer-readable storage medium having stored contents that cause a computing system to perform a method, the method comprising:
receiving, by the computing system, information about a plurality of prior vehicle trips along a road by a plurality of vehicles that reflect actual prior behavior of a plurality of drivers, wherein the received information includes, for each of the prior vehicle trips, indications of multiple road locations of the vehicle during the vehicle trip and of an associated time for each of the indicated road locations, and wherein the indications of the multiple road locations of the vehicle during the vehicle trip are generated by a device in the vehicle that has location determination capabilities and that is at least one of a mobile device of a user who is in the vehicle or a part of a navigation system for the vehicle;
automatically analyzing, by the computing system, the received information about the plurality of prior vehicle trips to determine an actual time delay associated with a structural traffic flow impediment on the road based on the actual prior behavior of the plurality of drivers, the traffic flow impediment being associated with restricted traffic flow on the road in at least some situations, the automatic analyzing including:
for each of multiple of the plurality of prior vehicle trips that travel past the traffic flow impediment, determining, by the computing system, an amount of delay in traversal time of the traffic flow impediment for the prior vehicle trip based on a numerical difference between an actual amount of traversal time of the traffic flow impediment during the prior vehicle trip and an expected traversal time amount for the traffic flow impediment if traffic flow on the road is not restricted; and aggregating, by the computing system, the determined traversal time delay amounts for the multiple prior vehicle trips to generate a representative time delay amount to use as the determined actual time delay for the traffic flow impediment; and indicating, by the computing system, the determined actual time delay for the traffic flow impediment, to enable future routing decisions for subsequent vehicle travel based on the determined actual time delay.

29. The non-transitory computer-readable storage medium of claim 28 wherein the traffic flow impediment is a structural feature of the road that restricts traffic flow on the road during at least some times to speeds below an average speed for the road, and wherein the aggregating of the determined traversal time delay amounts for the multiple prior vehicle trips to generate the representative time delay amount includes calculating one or more average traversal time delay amounts for the traffic flow impediment.

30. The non-transitory computer-readable storage medium of claim 29 wherein the indicating of the determined actual time delay for the traffic flow impediment includes using, by the computing system, the determined actual time delay for the traffic flow impediment as part of selecting one of multiple alternative paths for a route, at least one of the multiple alternative paths including the traffic flow impediment on the road.

31. The non-transitory computer-readable storage medium of claim 28 wherein the determining of the actual time delay associated with the structural traffic flow impediment is further performed by the computing system for each of one or more distinct aggregation categories that each includes at least one of one or more time periods and one or more non-time factors, by selecting a subset of the multiple prior vehicle trips traveling past the traffic flow impediment that correspond to the aggregation category, and by generating a determined actual time delay for the traffic flow impediment for the aggregation category based on the determined amount of traversal time delays for the traffic flow implement for the selected subset of prior vehicle trips.

32. The non-transitory computer-readable storage medium of claim 31 wherein the one or more distinct aggregation categories include multiple aggregation categories that each includes a distinct period of time, and wherein the generated determined actual time delays for the traffic flow impediment for the multiple distinct aggregation categories include multiple distinct values.

33. The non-transitory computer-readable storage medium of claim 31 wherein the one or more distinct aggregation categories include multiple aggregation categories that each includes one or more non-time factors that include at least one of a vehicle type and of a driver preference, and wherein the generated determined actual time delays for the traffic flow impediment for the multiple distinct aggregation categories include multiple distinct values.

34. The non-transitory computer-readable storage medium of claim 28 wherein the computing system is part of a driver behavior analysis system, and wherein the device in the vehicle for each of the prior vehicle trips has wireless transmission capabilities that are used to send to the computing system multiple data samples that include the indications of the multiple road locations of the vehicle during the vehicle trip.

35. The non-transitory computer-readable storage medium of claim 28 wherein the computer-readable storage medium is a memory of the computing system, and wherein the stored contents are software instructions that, when executed, program the computing system to perform the method.

36. A computing system, comprising:
one or more processors; and
one or more memories with stored instructions of a turn cost determiner module that, when executed by at least one of the one or more processors, cause the at least one processor to automatically determine an actual time delay associated with a traffic flow impediment that is part of a road based on actual prior behavior of a plurality of drivers on the road, the automatic determining of the actual time delay including:

receiving information about a plurality of prior vehicle trips along the road by a plurality of vehicles under control of the plurality of drivers, wherein the received information includes, for each of the prior vehicle trips, indications of multiple road locations of the vehicle during the vehicle trip and of an associated time for each of the indicated road locations, and wherein the indications of the multiple road locations of the vehicle during the vehicle trip are generated by a device in the vehicle that has location determination capabilities and that is at least one of a mobile device of a user who is in the vehicle or a part of a navigation system for the vehicle;

for each of multiple of the plurality of prior vehicle trips that include the traffic flow impediment, determining an amount of delay in traversal time of the traffic flow impediment for the prior vehicle trip based on a numerical difference between an amount of traversal time of the traffic flow impediment during the prior vehicle trip and an expected traversal time amount for the traffic flow impediment when traffic flow on the road is not restricted;

aggregating the determined traversal time delay amounts for the multiple prior vehicle trips to generate a representative time delay amount to use as the determined actual time delay for the traffic flow impediment; and indicating the determined actual time delay for the traffic flow impediment, to enable future routing decisions for subsequent vehicle travel based on the determined actual time delay.

37. The computing system of claim 36 wherein the turn cost determiner module is part of an automated driver behavior analysis system, and wherein the indicating of the determined actual time delay for the traffic flow impediment includes using the determined actual time delay for the traffic flow impediment as part of generating a route for a vehicle that includes at least a portion of the road.

38. The computing system of claim 37 wherein the traffic flow impediment is a structural feature of the road that restricts traffic flow on the road during at least some times to speeds below an average speed for the road, and wherein the aggregating of the determined traversal time delay amounts for the multiple prior vehicle trips to generate the representative time delay amount includes calculating one or more average traversal time delay amounts for the traffic flow impediment.

* * * * *